(12) United States Patent
Harada et al.

(10) Patent No.: US 7,889,863 B2
(45) Date of Patent: Feb. 15, 2011

(54) RECORDING DEVICE, RECORDING MEDIUM, AND CONTENT PROTECTION SYSTEM

(75) Inventors: Shunji Harada, Osaka (JP); Yoshikatsu Ito, Osaka (JP); Toshihisa Nakano, Osaka (JP); Kaoru Yokota, Hyogo (JP); Motoji Ohmori, Osaka (JP); Jun Takahashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 868 days.

(21) Appl. No.: 11/578,571

(22) PCT Filed: Mar. 22, 2005

(86) PCT No.: PCT/JP2005/005127

§ 371 (c)(1),
(2), (4) Date: Jul. 12, 2007

(87) PCT Pub. No.: WO2005/103907

PCT Pub. Date: Nov. 3, 2005

(65) Prior Publication Data

US 2007/0258587 A1  Nov. 8, 2007

(30) Foreign Application Priority Data

Apr. 21, 2004 (JP) ............................. 2004-125196

(51) Int. Cl.
*H04N 7/167* (2006.01)
*H04L 9/08* (2006.01)
*G06F 11/30* (2006.01)
*G06F 7/04* (2006.01)
*G06F 21/00* (2006.01)
*G06F 15/167* (2006.01)

(52) U.S. Cl. ...................... 380/201; 380/278; 713/189; 713/193; 726/7; 705/51; 709/216

(58) Field of Classification Search ................. 713/193; 380/201
See application file for complete search history.

(56) References Cited

U.S. PATENT DOCUMENTS 6,807,641 B1 * 10/2004 Ishiguro et al. ................ 714/6

(Continued)

FOREIGN PATENT DOCUMENTS

CN    1287665 A    3/2001

(Continued)

*Primary Examiner*—Taghi T Arani
*Assistant Examiner*—Morshed Mehedi
(74) *Attorney, Agent, or Firm*—Wenderoth, Lind & Ponack, L.L.P.

(57) ABSTRACT

A recording/playback apparatus is capable of using pre-image-converted content in a case of transferring an image-converted content to another device, then back from transfer-destination device to the recording/playback apparatus. The recording/playback apparatus includes a storage unit that stores a first encrypted content generated by encrypting the content, a second encrypted content generated by performing an irreversible compression to convert the content, thereby obtaining a converted content, and by encrypting the converted content, and a content key for decryption of the first and second encrypted contents, a key transfer unit that writes the content key to the external recording medium, and erases the content key stored in the storage unit, and a content transfer unit that, after the content key has been erased, writes the second encrypted content to the external recording medium, and erases the second encrypted content from the storage unit.

14 Claims, 31 Drawing Sheets

U.S. PATENT DOCUMENTS

| | | | | |
|---|---|---|---|---|
| 6,832,731 | B2* | 12/2004 | Kaneko | 235/492 |
| 6,868,494 | B1* | 3/2005 | Shitara et al. | 713/189 |
| 7,099,479 | B1* | 8/2006 | Ishibashi et al. | 380/281 |
| 7,239,800 | B2* | 7/2007 | Bilbrey | 386/105 |
| 7,315,829 | B1* | 1/2008 | Tagawa et al. | 705/26 |
| 7,383,446 | B1* | 6/2008 | Hatanaka et al. | 713/193 |
| 2002/0126843 | A1* | 9/2002 | Murase et al. | 380/201 |
| 2002/0159592 | A1* | 10/2002 | Matsushima et al. | 380/201 |
| 2003/0007640 | A1* | 1/2003 | Harada et al. | 380/270 |
| 2003/0009667 | A1* | 1/2003 | Horiuchi et al. | 713/168 |
| 2003/0009681 | A1* | 1/2003 | Harada et al. | 713/193 |
| 2003/0126455 | A1* | 7/2003 | Sako et al. | 713/193 |
| 2003/0149886 | A1* | 8/2003 | Ito et al. | 713/193 |
| 2003/0190044 | A1* | 10/2003 | Higashi et al. | 380/201 |
| 2003/0231334 | A1* | 12/2003 | Nagai et al. | 358/1.14 |
| 2004/0078066 | A1* | 4/2004 | Ohta et al. | 607/60 |
| 2004/0158712 | A1* | 8/2004 | Lee et al. | 713/165 |

FOREIGN PATENT DOCUMENTS

| | | |
|---|---|---|
| EP | 1 045 388 | 10/2000 |
| JP | 2000-347946 | 12/2000 |
| JP | 2002-244926 | 8/2002 |
| JP | 2003-228522 | 8/2003 |

* cited by examiner

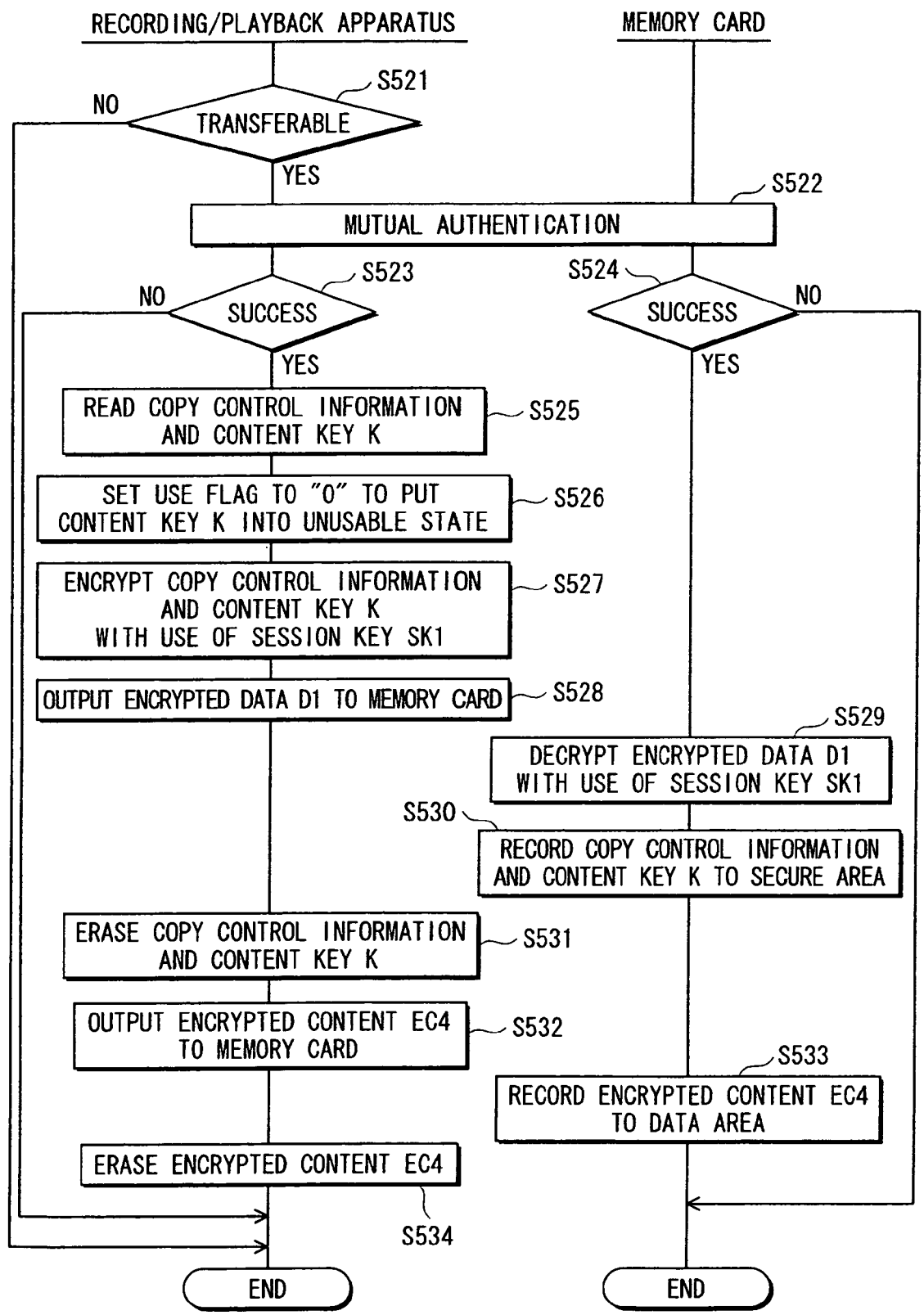

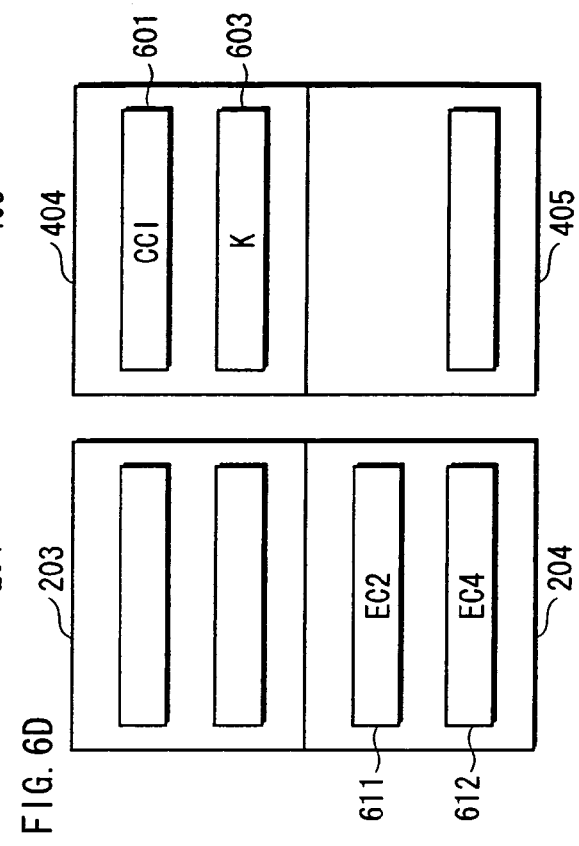
FIG. 6A
FIG. 6B
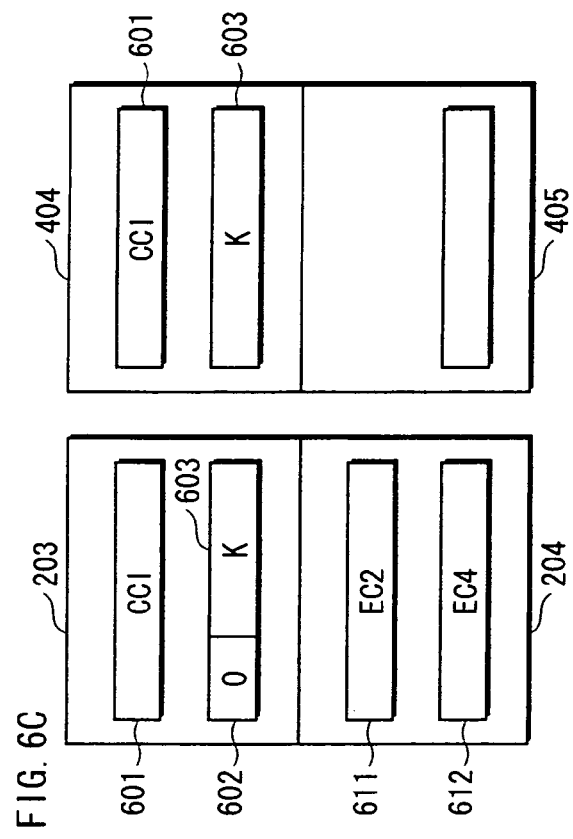
FIG. 6C
FIG. 6D

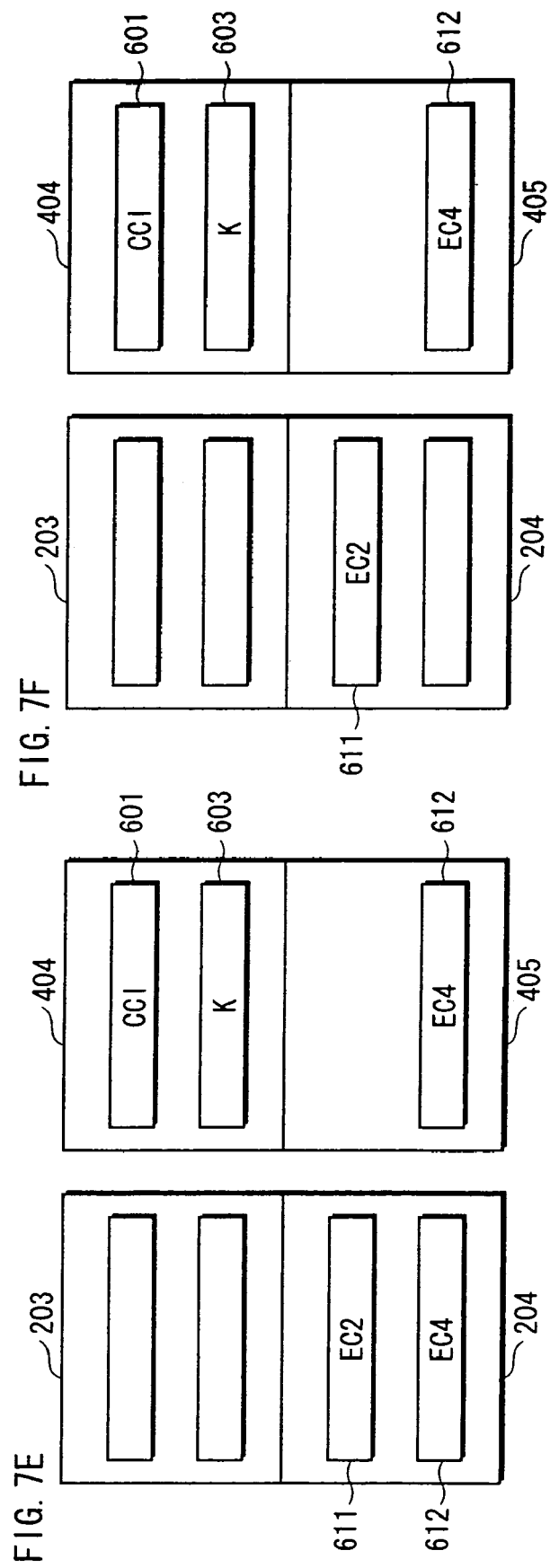

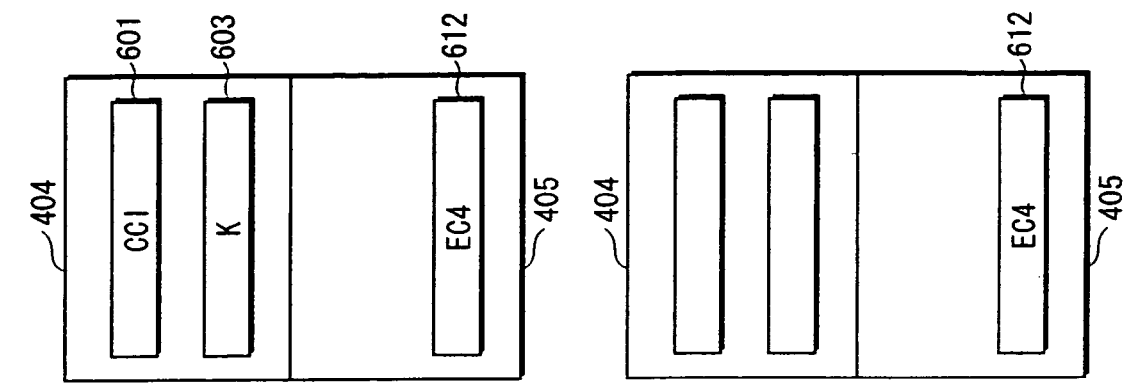
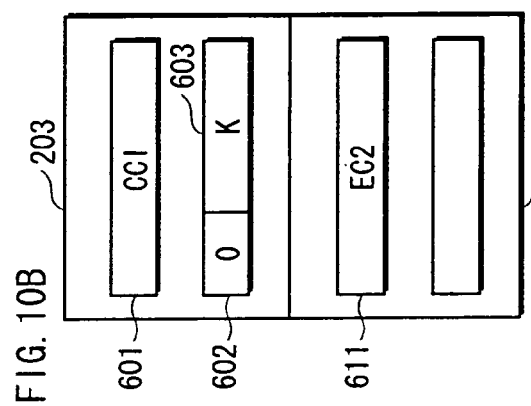
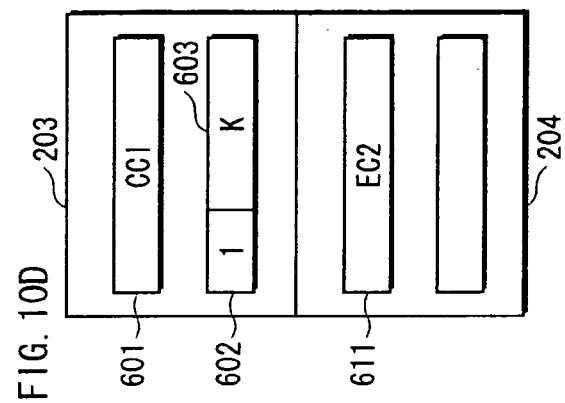
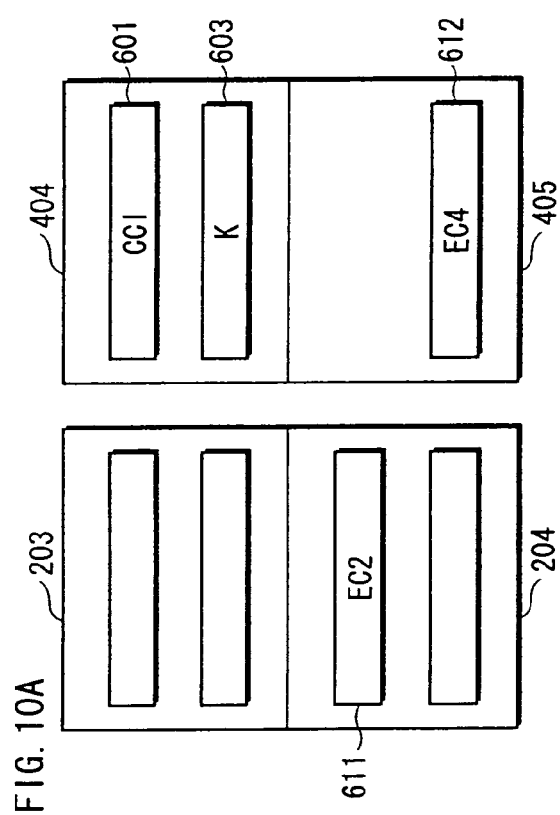
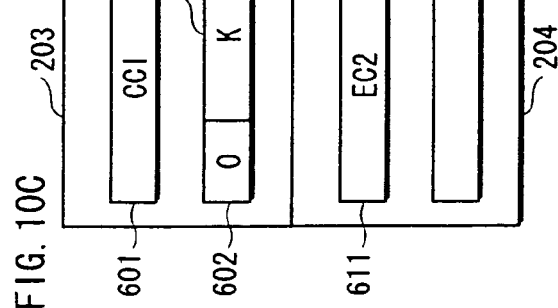

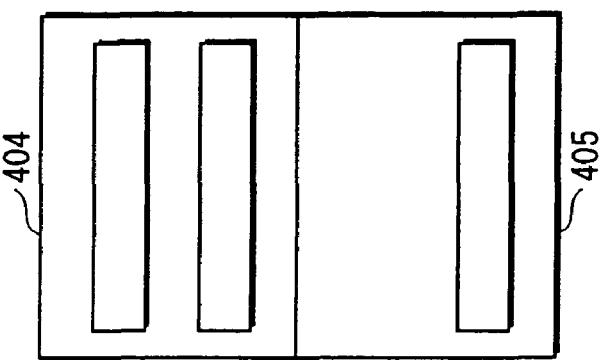
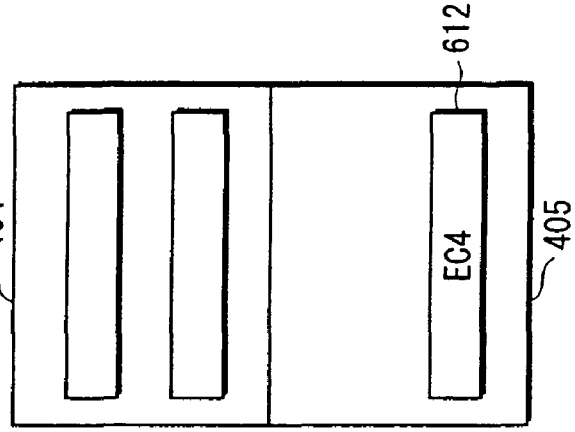
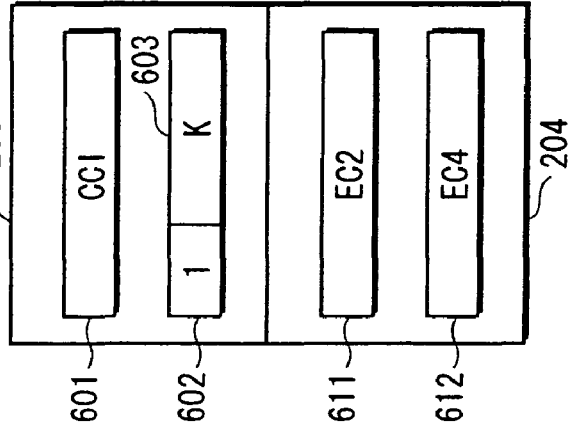

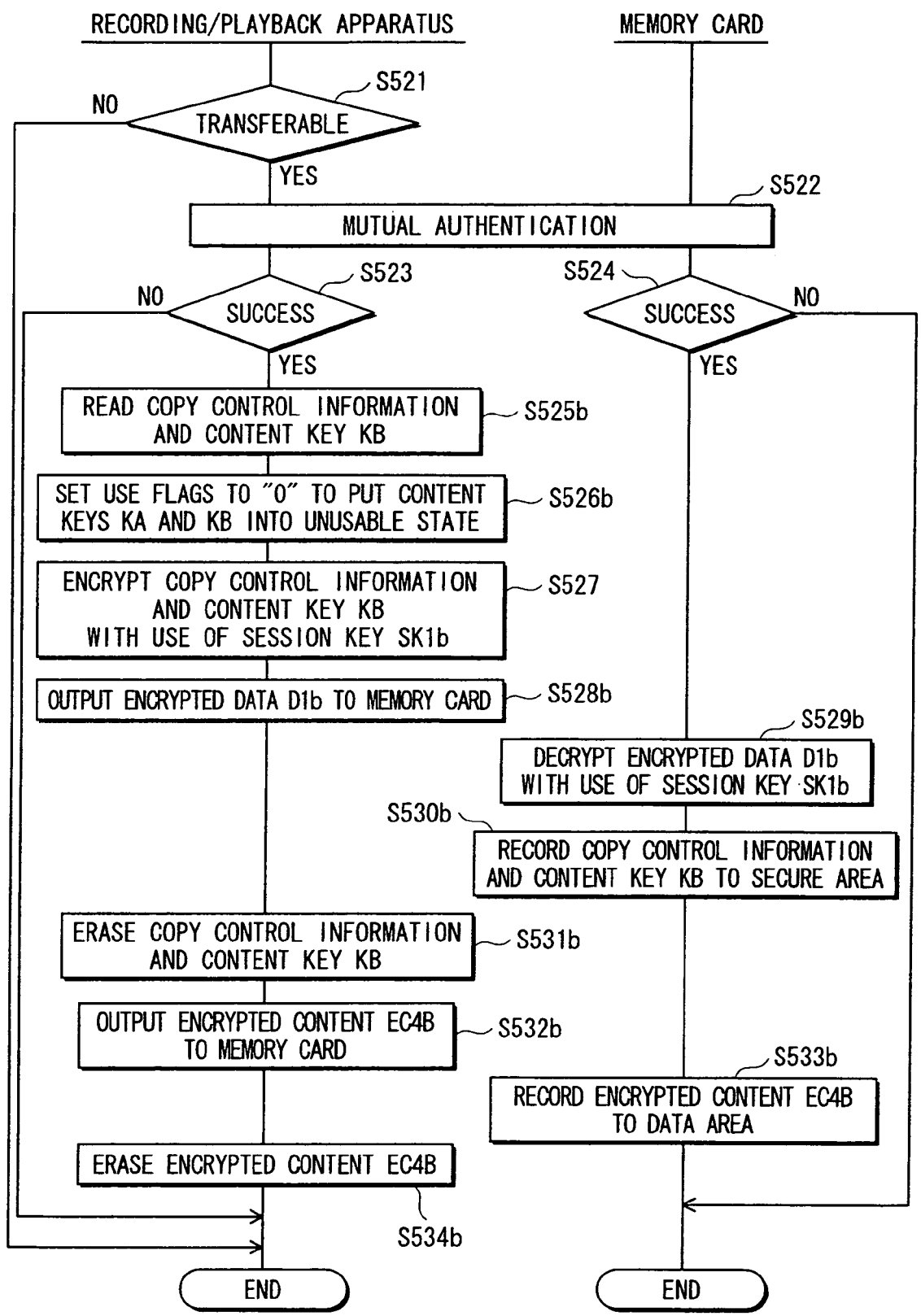

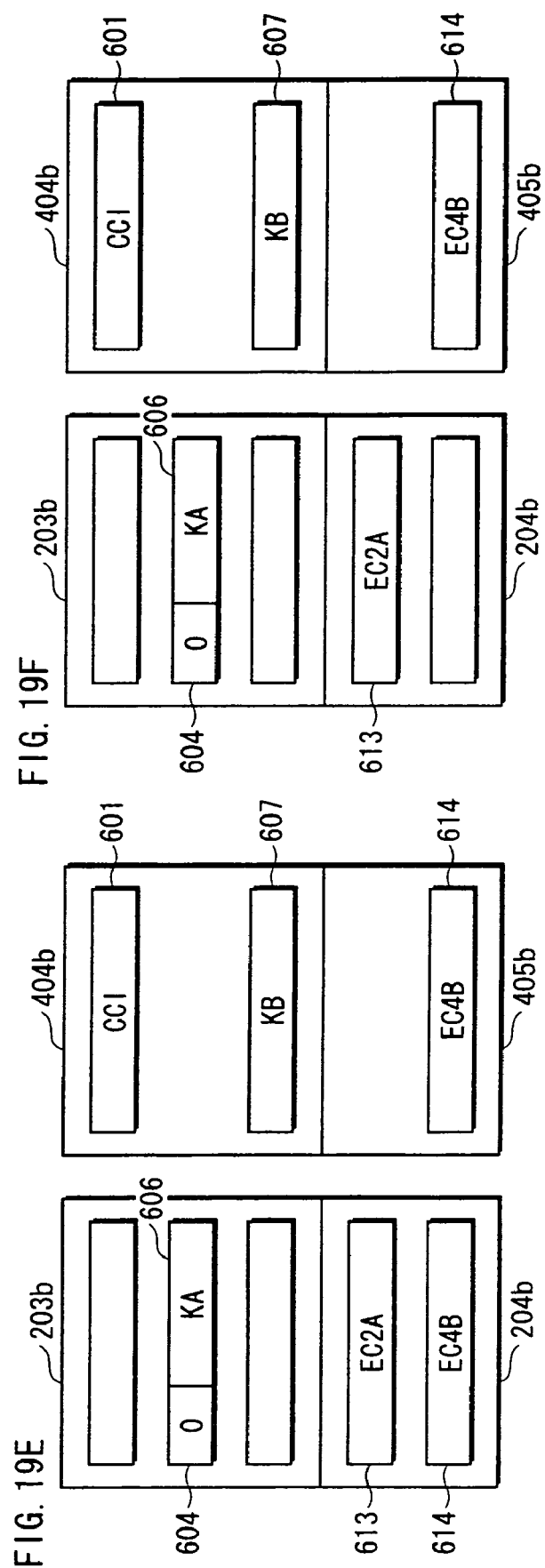

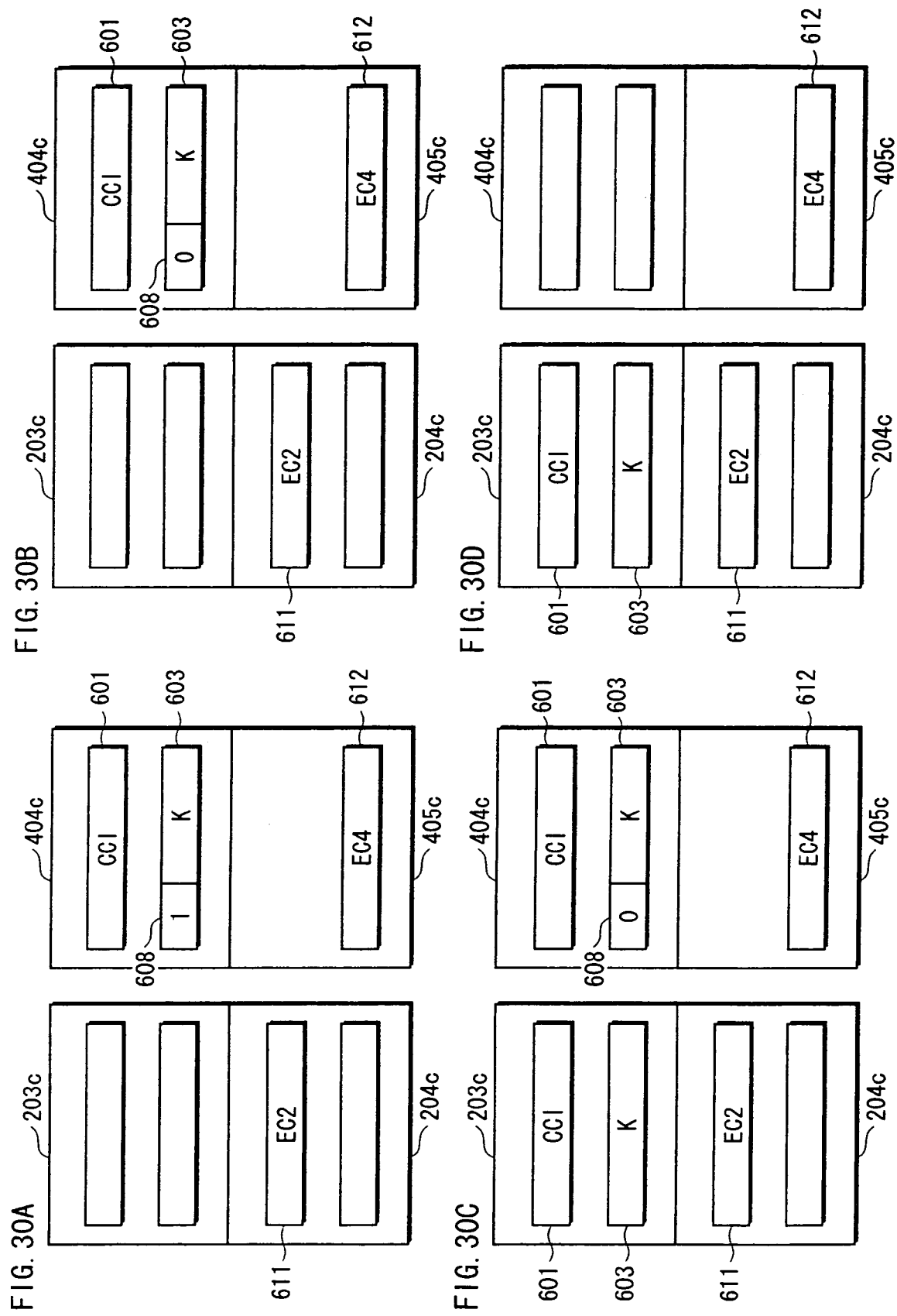

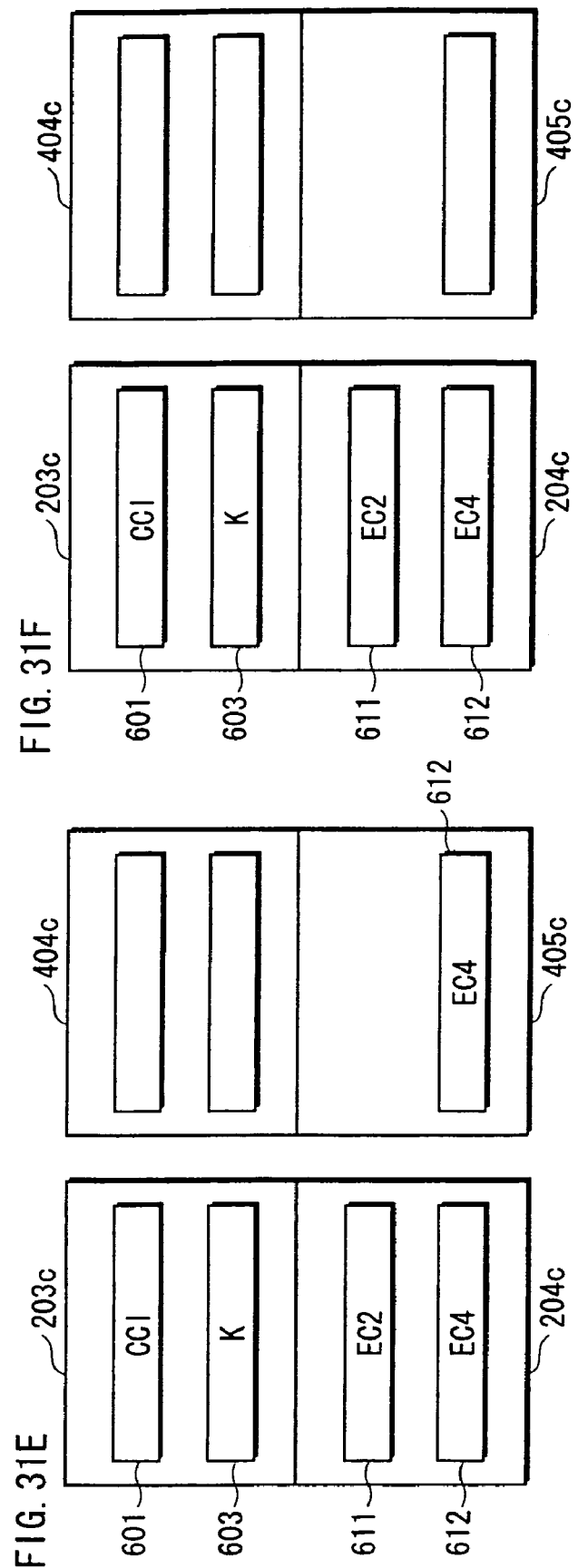

RECORDING DEVICE, RECORDING MEDIUM, AND CONTENT PROTECTION SYSTEM

TECHNICAL FIELD

The present invention relates to a recording/playback apparatus for recording/playing back content, and in particular to technology for preventing unauthorized use of content while improving user convenience.

BACKGROUND ART

As one measure for copy-guarding digital broadcast programs, a "Copy One Generation" control signal indicating that recording is possible only one time is added to the digital broadcast program before encryption and broadcasting. A digital broadcast program having a "Copy One Generation" control signal added in this way can be recorded using a recording/playback apparatus that includes an appropriate copyright protection function. The recorded digital broadcast program cannot be dubbed to another device, but a transfer of the digital broadcast program is permitted.

Patent Document 1: Japanese Patent Application Publication No. 2003-228522

Non-patent Document 1: "Gendai Angou Riron (Modern Encryption Theory)" by Nobuichi Ikeno and Kenji Koyama, Institute of Electronics, Information and Communications Engineers Non-patent Document 2: "Gendai Angou Nyuumon (Introduction to Modern Encryption)" by Eiji Okamoto, Kyoritsu Shuppan Co., Ltd.

DISCLOSURE OF THE INVENTION

Problems Solved by the Invention

However, given that digital broadcast programs are high-resolution content composed of a large amount of data, a case of transferring a digital broadcast program to a destination device with a small storage capacity such as a memory card requires the recording/playback apparatus to compress the high-resolution content using image conversion, and transfer the reduced amount of data to the memory card.

In this case, if the content is transferred from the destination memory card back to the original recording/playback apparatus, the recording/playback apparatus can no longer use the original high-resolution content since it has been lost due to the image conversion.

The present invention has been achieved in light of this problem, and aims to provide a recording apparatus, recording medium and content protection system that can use pre-image-conversion content in a case of transferring image-converted content to another device and then back to the original recording/playback apparatus.

Means to Solve the Problems

In order to achieve the above object, the present invention is a recording apparatus for transferring a usage right of a content to an external recording medium while protecting a copyright of the content, including a storage unit operable to store a first encrypted content generated by encrypting the content, a second encrypted content generated by performing an irreversible compression to convert the content, thereby obtaining a converted content, and by encrypting the converted content, and a content key for decryption of the first and second encrypted contents; a key transfer unit operable to write the content key to the external recording medium, and erase the content key stored in the storage unit; and a content transfer unit operable, after the content key has been erased, to write the second encrypted content to the external recording medium, and erase the second encrypted content from the storage unit.

Effects of the Invention

According to this structure, use of the first encrypted content in the recording apparatus is disabled since the content key is deleted from the recording apparatus, thereby making it possible to protect a copyright even if second encrypted content is transferred. Also, given that the first encrypted content is left stored in the recording apparatus, the unconverted content can be used if the content key is acquired.

BRIEF DESCRIPTION OF THE DRAWINGS

FIG. 5 is a flowchart showing operations in a case of transferring an encrypted content EC4;

FIGS. 6A to 6D show states of data in recording areas in the case of transferring the encrypted content EC4, continuing to FIGS. 7E and 7F;

FIGS. 7E and 7F show states of data in recording areas in the case of transferring the encrypted content EC4, continued from FIGS. 6A to 6D;

FIGS. 10A to 10D show states of data in recording areas in the case of returning the encrypted content EC4 to the original recording/playback apparatus, continuing to FIGS. 11E and 11F;

FIGS. 11E and 11F show states of data in recording areas in the case of returning the encrypted content EC4 to the L original recording/playback apparatus, continued from FIGS. 10A to 10D;

FIG. 17 is a flowchart showing operations in a case of transferring an encrypted content EC4B;

FIGS. 19E and 19F show states of data in recording areas in the case of transferring the encrypted content EC4B, continued from FIGS. 18A to 18D;

FIGS. 30A to 30D show states of data in recording areas in the above case, continuing to FIGS. 31E and 31F; and FIGS. 31E and 31F show states of data in recording areas in the above case, continued from FIGS. 30A to 30D.

Figure 1:
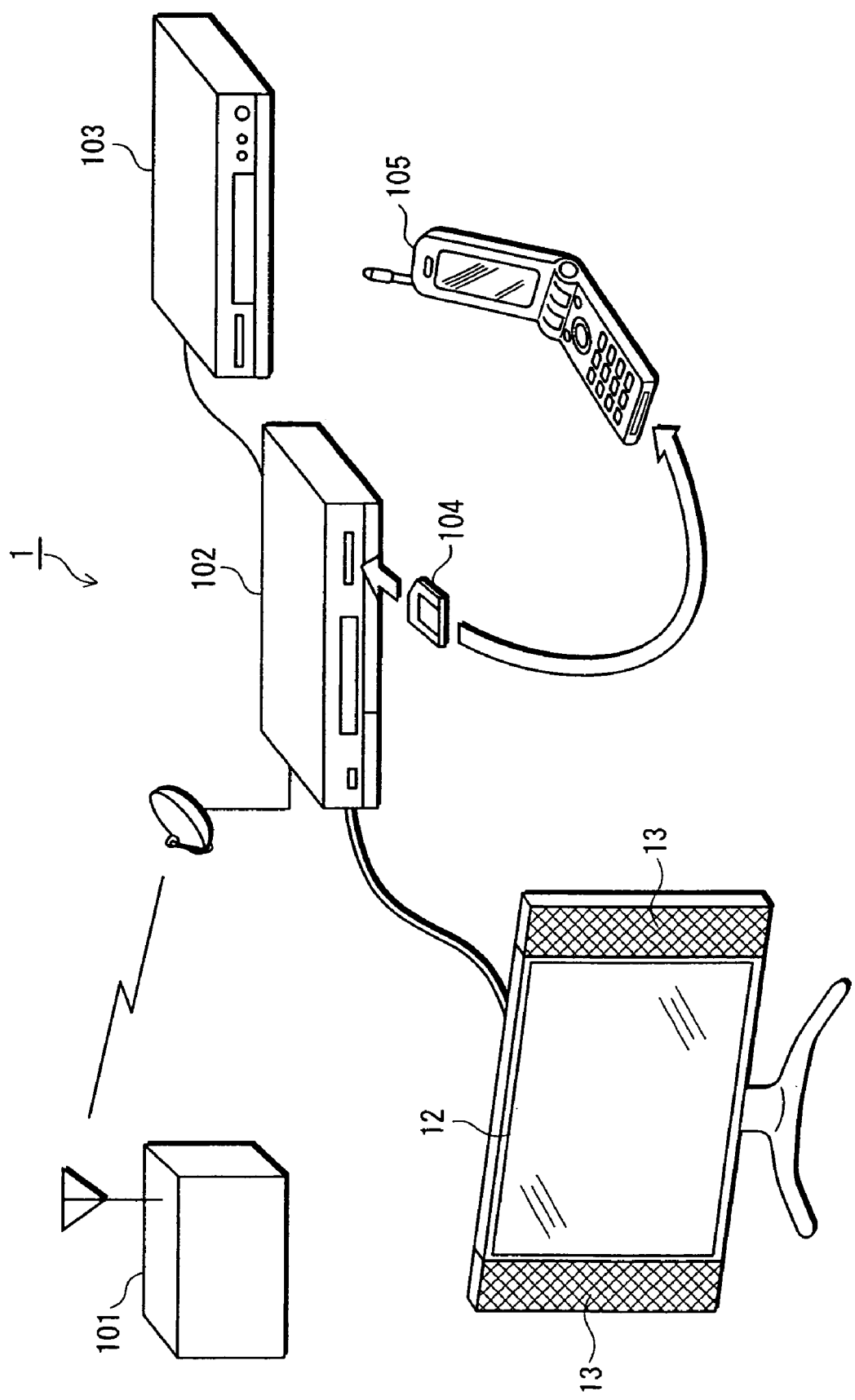
FIG. 1 shows an overall structure of a copyrighted work protection system 1 of a first embodiment.

DESCRIPTION OF THE CHARACTERS 1 copyrighted work protection system
101 content supply apparatus
102 recording/playback apparatus
103 recording/playback apparatus
104 memory card
105 mobile device

BEST MODE FOR CARRYING OUT THE INVENTION

First Embodiment

A first embodiment of the present invention is described in detail below with reference to the drawings.

1. Structure of a Copyrighted Work Protection System 1

As shown in FIG. 1, a copyrighted work protection system 1 includes a content supply apparatus 101, a recording/playback apparatus 102, a recording/playback apparatus 103, a memory card 104, a mobile device 105, a monitor 12 and a speaker 13.

In the copyrighted work protection system 1, a digital content is supplied from the content supply apparatus 101, received by the recording/playback apparatus 102, and recorded if recordable. A user can view the content recorded in the recording/playback apparatus 102 by outputting the content to the monitor 12 and the speaker 13 which are connected to the recording/playback apparatus 102.

The user can also transfer the recorded content to the memory card 104, which is a portable recording medium, connect the memory card to the mobile device 105, and view the transferred content using the mobile device 105.

The content in the recording/playback apparatus 102 cannot be viewed using the monitor 12 and the speaker 13 if the content is transferred to the memory card 104, but can again be viewed this way if the content is transferred from the memory card 104 back to the recording/playback apparatus 102. It is the same in a case of transferring content from the recording/playback apparatus 102 to the recording/playback apparatus 103.

The following describes structures of the above apparatuses.

1.1 Content Supply Apparatus 101

The content supply apparatus 101 is an apparatus for broadcasting digital content, and is included in a broadcast station. The content supply apparatus 101 broadcasts a content C2 which is a transport stream compressed and encoded according to, for example, the MPEG (Moving Picture Experts Group phase)-2 standard. The content C2 broadcasted from the content supply apparatus 101 is received by the recording/playback apparatus 102 using an antenna.

1.2 Structure of the Recording/Playback Apparatus 102

Figure 2:
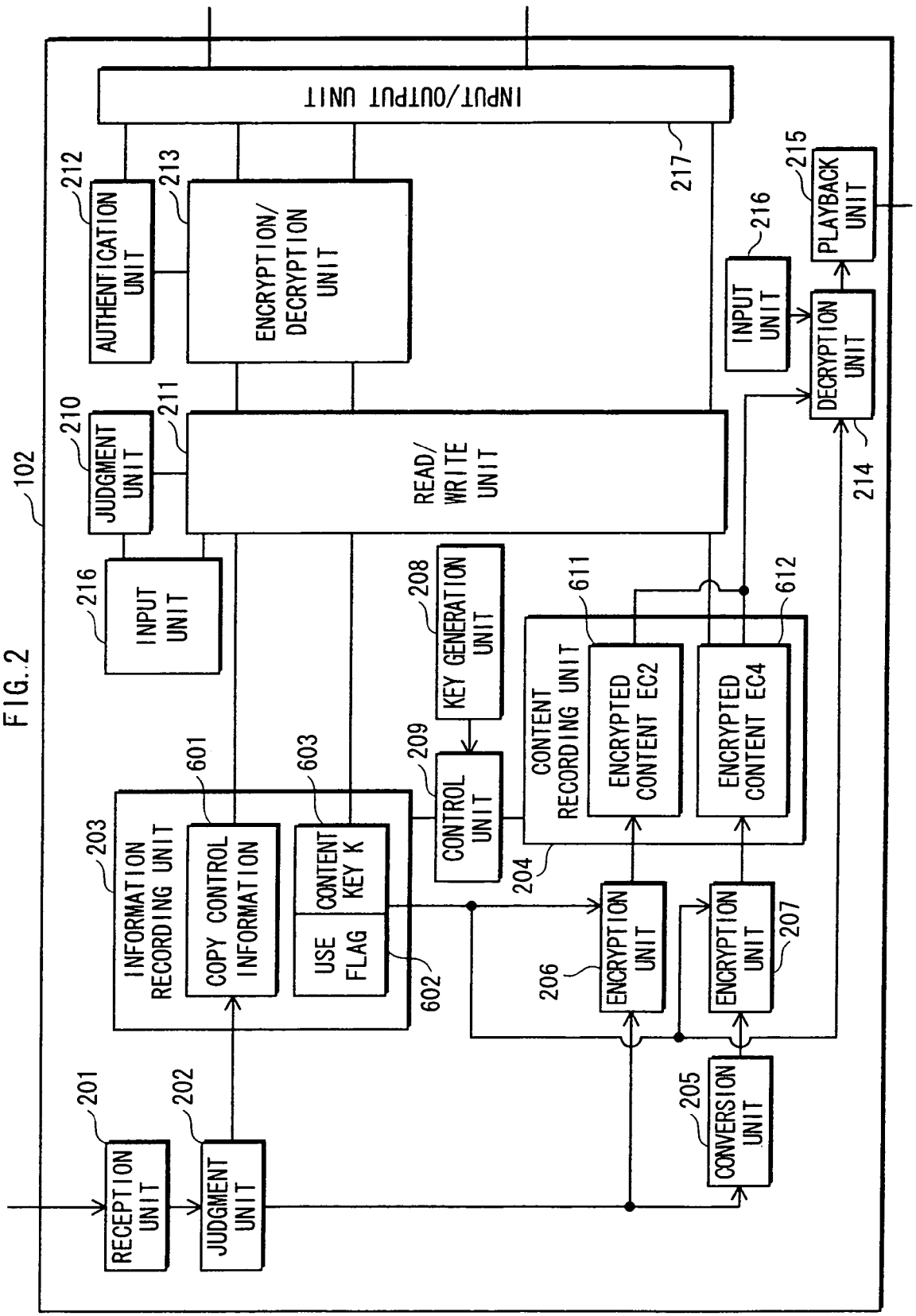
FIG. 2 is a block diagram showing a structure of a recording/playback apparatus 102.

As shown in FIG. 2, the recording/playback apparatus 102 includes a reception unit 201, a judgment unit 202, an information recording unit 203, a content recording unit 204, a conversion unit 205, an encryption unit 206, an encryption unit 207, a key generation unit 208, a control unit 209, a judgment unit 210, a read/write unit 211, an authentication unit 212, an encryption/decryption unit 213, a decryption unit 214, a playback unit 215, an input unit 216 and an input/output unit 217.

(1) Reception Unit 201

The reception unit 201 receives the content C2 broadcast by the content supply apparatus 101.

Along with the content C2, the reception unit 201 also receives copy control information pertaining to the content C2. The copy control information indicates rules regarding use of the associated content. The copy control information is, for example, 2 bit data indicating four states which are (a) "Copy Free" allowing copying to be performed freely, (b) "Copy One Generation" allowing copying to be performed once, (c) "Copy Never" prohibiting copying, and (d) "No More Copy" prohibiting further copying after copying has been performed once.

The reception unit 201 outputs the received content C2 and copy control information to the judgment unit 202.

(2) Judgment Unit 202

The judgment unit 202 receives the content C2 and the copy control information, and judges whether the copy control information allows recording. If the copy control information indicates "Copy One Generation", the judgment unit 202 judges that the content C2 may be recorded once, and outputs the content C2 to the conversion unit 205 and the encryption unit 206. The judgment unit 202 also overwrites the copy control information with data indicating "No More Copy", and writes the overwritten copy control information to the information recording unit 203 as copy control information 601.

Note that in the case of "Copy Free", the copy control information is written to the information recording unit 203 without being overwritten.

(3) Key Generation Unit 208

The key generation unit 208 generates a content key K 603. The content key K 603 is key data used during encryption of the content C2 by the encryption units 206 and 207. The content key K 603 is also during decryption of encrypted content by the decryption unit 214.

The key generation unit 208 outputs the generated content key K 603 to the control unit 209.

(4) Control Unit 209

The control unit 209 is provided in a tamper-resistant area which cannot be accessed externally. Here, the tamper-resistant area includes, specifically, tamper-resistant hardware, tamper-resistant software, or a combination of these.

Upon receiving the content key K from the key generation unit 208, the control unit 209 writes the content key K, as the content key K 603, to the information recording unit 203 in association with a use flag 602.

The use flag 602 has a value of "1" or "0". A value of "1" indicates that the associated content key K 603 is in a usable state, while a value of "0" indicates that the content key K 603 is in an unusable state. The unusable state means that the read/write unit 211, the encryption units 206 and 207, and the decryption unit 214 are prohibited from using the content key K, nor can any of the units read the content key K 603. A usable state means that the content key K 603 can be read and used.

When writing the content key K 603, the control unit 209 records the content key K 603 in association with the use flag "1".

Also, when transferring an encrypted content EC4 to the memory card 104, the control unit 209 sets the use flag 602 to "0" once the read/write unit 211 reads the content key K 603, thereby putting the content key K 603 in the unusable state.

Also, when transferring the encrypted content EC4 from the memory card 104 back to the recording/playback apparatus 102, the control unit 209 sets the use flag to "0" once the content key K is written from the read/write unit 211, then sets the use flag to "1" once the content key K is erased from the memory card 104.

(5) Information Recording Unit 203

The information recording unit 203 is a tamper-resistant area, and cannot be written to or read from by an external apparatus. The information recording unit 203 is specifically tamper-resistant hardware, tamper-resistant software, or a combination of these.

The information recording unit 203 includes an area having recorded therein the copy control information 601, the use flag 602, and the content key K 603.

(6) Conversion Unit 205

The conversion unit 205 performs compression conversion to reduce the amount of data in the received content.

For example, the conversion unit 205 converts the MPEG2 formatted content C2 to an MPEG4 formatted content C4. Note that the method of converting MPEG2 to MPEG4 is not described since it is known technology.

Given that such conversion from MPEG2 to MPEG4 is irreversible compression, and results in content with a lower quality than the received content, the content C4 that was converted to MPEG4 cannot be returned to the pre-conversion MPEG2.

Note that the conversion performed by the conversion unit 205 involves reducing the amount of data by down-converting the received content, and is not limited to using MPEG2 and MPEG4. The received content may be converted using another compression method as long as the compression method has a higher compression rate than the received content, and the amount of data is reduced.

The conversion unit 205 outputs the content C4 to the encryption unit 207.

(7) Encryption Units 206 and 207

The encryption unit 206 receives the content C2 from the judgment unit 202, and reads the content key K 603 from the information recording unit 203. The encryption unit 206 performs an encryption algorithm E1 on the content C2 with use of the read content key K 603, thereby generating encrypted content EC2.

Also, the encryption unit 207 receives the converted content C4 from the conversion unit 205. Similarly to the encryption unit 206, the encryption unit 207 reads the content key K 603 from the information recording unit 203, and performs an encryption algorithm E1 on the content C4 with use of the content key K 603, thereby generating encrypted content EC4.

The encryption units 206 and 207 record the generated encrypted content EC2 and EC4 in the content recording unit 204.

Note that the encryption algorithm E1 is, for example, DES encryption. A description of DES has been omitted since it is a known technology.

(8) Content Recording Unit 204

The content recording unit 204 is a recording area that can be written to and read from externally, and is specifically structured from an HDD (Hard Disk Drive).

The content recording unit 204 includes an area that has recorded therein the encrypted contents EC2 and EC4.

(9) Judgment Unit 210

The judgment unit 210 judges whether the encrypted content EC4 may be transferred to the memory card 104.

The judgment unit 210 reads, via the read/write unit 211, copy control information 601 that is recorded in the information recording unit 203. If the copy control information 601 is "No More Copy", the judgment unit 210 judges that copying is prohibited, but a transfer is allowed.

The judgment unit 210 outputs the judgment result to the read/write unit 211.

(10) Read/Write Unit 211

The read/write unit 211 reads the copy control information 601 from the information recording unit 203, and outputs the read copy control information 601 to the judgment unit 210.

The read/write unit 211 also receives the judgment result from the judgment unit 210, and cancels transfer processing if the judgment result indicates that transferring is not permitted.

If the judgment result indicates that transferring is permitted, the read/write unit 210 performs transfer processing for the copy control information 601, the content key K 603 and the encrypted content EC4.

During transfer processing, the read/write unit 211 reads the copy control information 601 and the content key K 603 from the information recording unit 203, and outputs the copy control information 601 and the content key K 603 to the encryption/decryption unit 213. The read/write unit 211 also reads the encrypted content EC4 from the content recording unit 204, and outputs the encrypted content EC4 to the memory card 104 via the input/output unit 217.

In the case of transferring the encrypted content EC4 from the memory card 104 to the content recording unit 204, the read/write unit 211 receives the copy control information read from the memory card 104, and outputs the received copy control information to the judgment unit 210. If the judgment result received from the judgment unit 210 indicates that the encrypted content EC4 is transferable, the read/write unit 211 acquires the encrypted content EC4 from the memory card 104, and writes the encrypted content EC4 to the content recording unit 204, as mentioned later. The read/write unit 211 also writes the copy control information 601 and the content key K 603 to the information recording unit 203 upon receiving them from the encryption/decryption unit 213.

(11) Authentication Unit 212

The authentication unit 212 performs mutual authentication with an authentication unit 401 of the memory card 104. If the authentication is successful, the authentication unit 212 also shares with the memory card 104 a session key that is valid only for that session.

Note that although a description of the mutual authentication has been omitted since it is a known technology, a technique determined according to the DTCP (Digital Transmission Content Protection) standard may be used if the authenticatee is, for example, an apparatus. If the authenticatee is a recording medium, a technique determined according to the CPRM SD (Content Protection for Recordable Media Specification SD Memory Card Book) standard may be used.

Here, a session key generated when transferring the content EC4 to the memory card 104 is called a session key SK1, and a session key generated when transferring the content EC4 from the memory card 104 to the content recording unit 204 is called a session key SK2.

The authentication unit 212 outputs the shared session key SK1 or the session key SK2 to the encryption/decryption unit 213.

(12) Encryption/Decryption Unit 213

The encryption/decryption unit 213 receives the session key SK1 or SK2 from the authentication unit 212.

In the case of transferring the encrypted content EC4 to the memory card 104, the encryption/decryption unit 213 receives the copy control information 601 and the content key K 603 from the read/write unit 211. The encryption/decryption unit 213 performs the encryption algorithm E1 on the copy control information 601 and the content key K 603 with use of the session key SK1, thereby generating encrypted data D1. The encryption/decryption unit 213 outputs the generated encrypted data D1 to the memory card 104 via the input/output unit 217.

Also, in the case of transferring the encrypted content EC4 from the memory card 104 to the content recording unit 204, the encryption/decryption unit 213 receives, via the input/output unit 217, encrypted data D2 that has been read from the memory card 104. The encryption/decryption unit 213 performs a decryption algorithm D1 on the encrypted data D2 with use of the session key SK2, thereby generating the copy control information 601 and the content key K 603. The encryption/decryption unit 213 outputs the generated copy control information 601 and content key K 603 to the read/write unit 211.

(13) Input/Output Unit 217

The input/output unit 217 includes a memory card slot and performs input/output of information with the memory card 104.

(14) Input Unit 216

The input unit 216 receives input according to a user operation, and outputs the input to the units. Specifically, the input according to a user operation is a transfer of the encrypted content EC4, playback of the encrypted content EC2, and the like.

(15) Decryption Unit 214

If the input unit 216 receives an instruction to playback the encrypted content EC2, the decryption unit 214 reads the encrypted content EC2 from the content recording unit 204, and reads the content key K 603 from the information recording unit 203. The decryption unit 214 performs the decryption algorithm D1 on the encrypted content EC2 with use of the read content key K 603, thereby generating the content C2. The decryption unit 214 outputs the generated content C2 to the playback unit 215.

Note that the decryption unit 214 also performs the same processing when playing back the content C4.

(16) Playback Unit 215

The playback unit 215, which specifically includes an MPEG decoder, receives the decrypted content C2 from the decryption unit 215, and decodes the received content C2 to generate video signals and audio signals. The playback unit 215 outputs the generated video signals to the monitor 12, and outputs the generated audio signals to the speaker 13.

1.3 Monitor 12 and Speaker 13

The monitor 12 and the speaker 13 are, specifically, a digital TV connected to the recording/playback apparatus 102. The monitor 12 receives the video signals from the playback unit 106 and outputs the received video signals. The speaker 13 receives the audio signals from the playback unit 215, and outputs the received audio signals.

1.4 Memory Card 104

Figure 3:
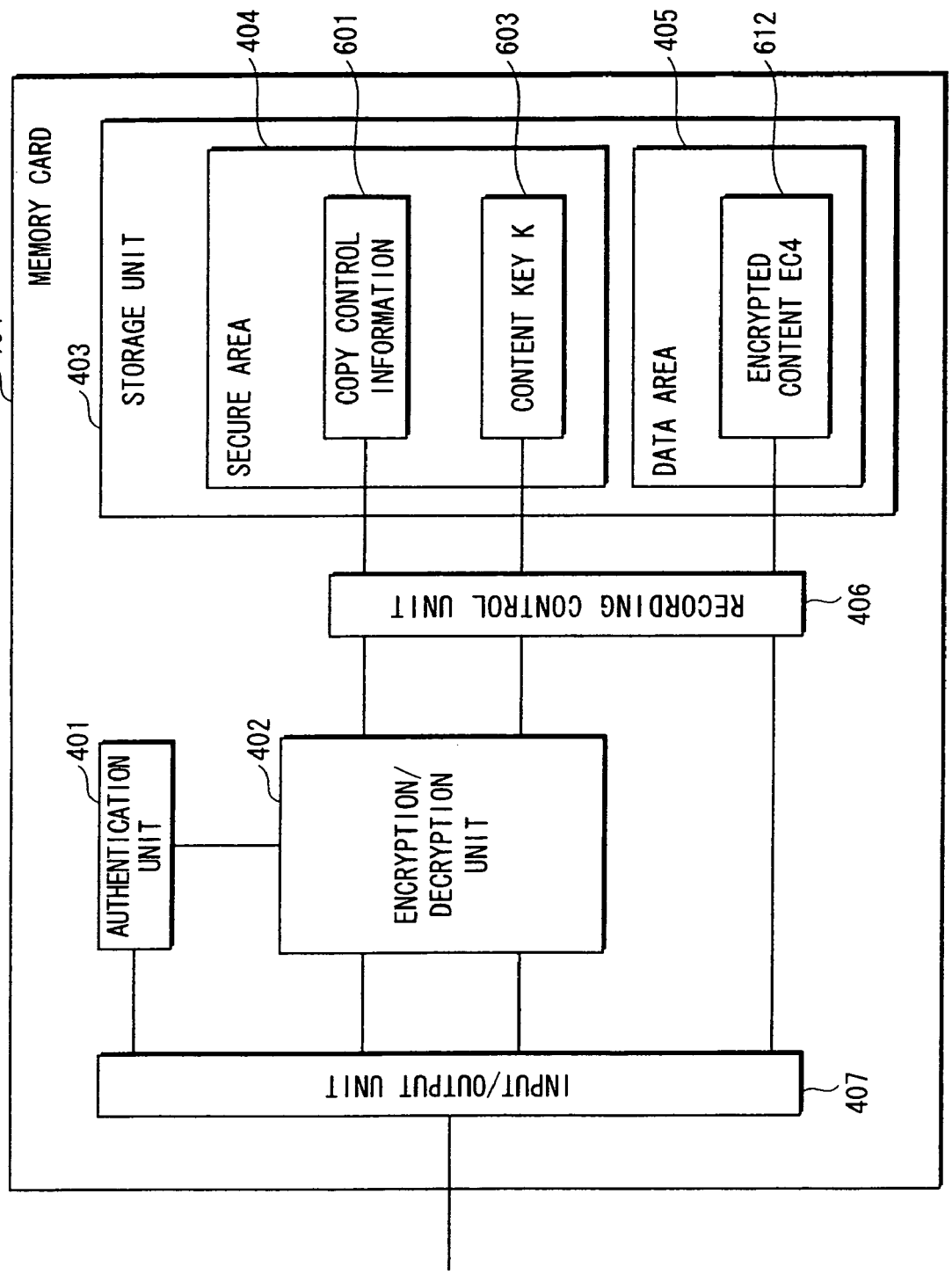
FIG. 3 is a block diagram showing a structure of a memory card 104.

As shown in FIG. 3, the memory card 104 includes the authentication unit 401, an encryption/decryption unit 402, a recording unit 403, a recording control unit 406 and an input/output unit 407.

The memory card 104 can be connected to the recording/playback apparatus 102 and the mobile device 105.

(1) Input/Output Unit 407

The input/output unit 407 is composed of connector pins and an interface driver, and is an interface for performing input/output of data with an apparatus in which the memory card 104 is loaded.

(2) Authentication Unit 401

The authentication unit 401 performs mutual authentication with the authentication unit 212 of the recording/playback apparatus 102, and shares the session key SK1 or SK2 if the authentication is successful. If the authentication fails, the authentication unit 401 ceases further processing.

The authentication unit 401 outputs the shared session key SK1 or SK2 to the encryption/decryption unit 402.

The authentication unit 401 also performs the same mutual authentication if the encrypted content EC4 is to be played back by the mobile device 105.

(3) Encryption/Decryption Unit 402

In a case of recording the encrypted content EC4, the encryption/decryption unit 402 receives the encrypted data D1 from the recording/playback apparatus 102 via the input/output unit 407, and performs the decryption algorithm D1 on the encrypted data D1 with use of the session key SK1, thereby generating the copy control information 601 and the content key K 603. The encryption/decryption unit 402 writes the generated copy control information 601 and content key K 603 to a secure area 404.

Also, in a case of transferring the encrypted content EC4 to the recording/playback apparatus 102, the encryption/decryption unit 402 performs the encryption algorithm E1 on the copy control information 601 and the content key K 603 with use of the session key SK2, thereby generating the encrypted data D2. The encryption/decryption unit 402 outputs the generated encrypted data D2 to the recording/playback apparatus 102 via the input/output unit 407.

Also, in a case of playing back the encrypted content EC4 on the mobile device 105, the encryption/decryption unit 402 receives the session key shared when the authentication unit 401 performed mutual authentication with the mobile device 105, uses the received session key to encrypt the content key K 603, and outputs the encrypted content key K 603 to the mobile device 105 via the input/output unit 407.

Note that the encryption/decryption unit 402 encrypts and outputs only the content key K 603 when playing backing content on the mobile device 105 since there is no need to output the copy control information 601, but encrypts and outputs both the copy control information 601 and the content key K 603 in a case of playing back the encrypted content EC4 on an apparatus that requires the copy control information 601 when playing back content.

(4) Recording Unit 403

The recording unit 403 includes the secure area 404 and a data area 405.

The secure area 404 is a tamper-resistant area that cannot be read from or written to externally, whereby access is permitted only from an apparatus that is successfully authenticated by the authentication unit 401.

The secure area 404 includes an area for storing the copy control information 601 and the content key K 603. The data area 405 is a recording area that can be accessed by an external apparatus.

The data area 405 includes an area for storing the encrypted content EC4.

(5) Recording Control Unit 406

The recording control unit 406 manages the recording unit 403.

The recording control unit 406 receives the device authentication result from the authentication unit 401, permits access to the secure area 404 from an apparatus if the device authentication result indicates successful authentication, and prohibits access to the secure area 404 if the device authentication result indicates failed authentication.

1.5 Mobile Device 105

The mobile device 105 includes an input/output unit, a control unit, a display, an operation unit, a decryption unit, a playback unit and a speaker, none of which are depicted.

When the memory card 104 storing the copy control information 601, the content key K 603 and the encrypted content EC4 is connected to the mobile device 105, similarly to the recording/playback apparatus 102, the decryption unit uses the content key K 603 to decrypt the encrypted content EC4, and the playback unit generates video signals and audio signals from the decrypted content and outputs the video and audio signals to the display and the speaker.

The mobile device 105 is also a computer system that specifically includes a CPU, a ROM, a RAM and a memory card slot. Note that the mobile device 105 may be a device specialized for playing back digital content, or a mobile phone, digital camera etc. including a digital content playback function.

1.6 Recording/Playback Apparatus 103

The recording/playback apparatus 103, which has the same structure as the recording/playback apparatus 102, stores and plays back the encrypted content EC2 and/or the encrypted content EC4 transferred from the recording/playback apparatus 102, and outputs the encrypted content EC2 or the encrypted content EC4 to the monitor 12 and the speaker 13. Note that a specific description of processing for transferring encrypted content from the recording/playback apparatus 102 to the recording/playback apparatus 103 has been omitted since it is the same as processing for transferring encrypted content to the memory card 104.

2. Operations of the Copyrighted Work Protection System 1

2.1 Recording of the Content C2

Figure 4:
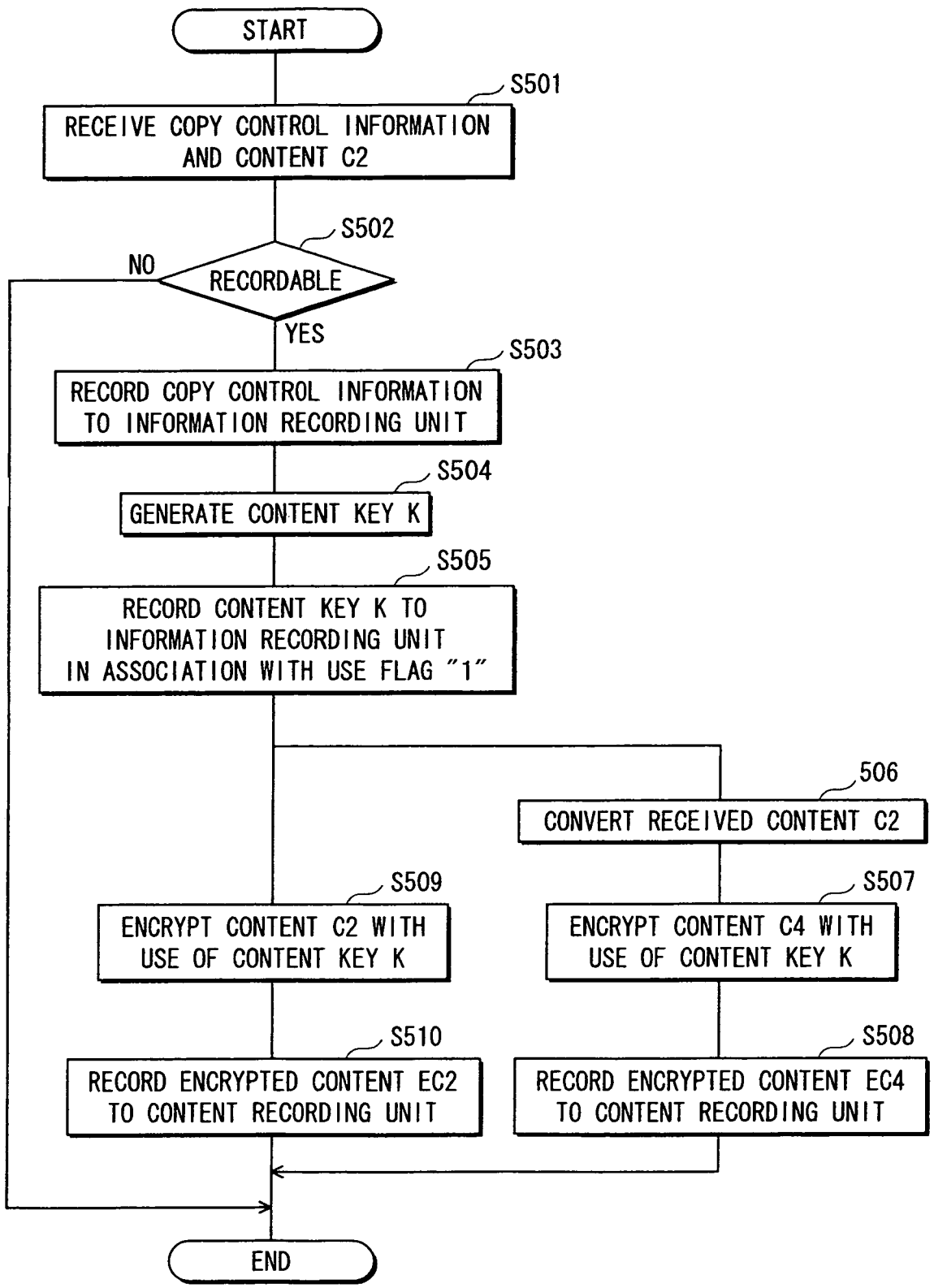
FIG. 4 is a flowchart showing operations in a case of recording a content C2.

Next is a description of operations performed by the recording/playback apparatus 102 when storing the content C2 received from the content supply apparatus 101, with reference to FIG. 4.

When the reception unit 201 receives the copy control information and the content C2 (step S501), the judgment unit 202 judges whether the copy control information attached to the content C2 indicates recordability (step S502), and, if the received copy control information indicates "Copy Never", judges that the content C2 cannot be recorded (step S502:NO) and ceases to perform further processing, whereby processing ends. If the received copy control information indicates "Copy One Generation", the judgment unit 202 judges that the content C2 can be recorded (step S502:YES), rewrites the copy control information from "Copy One Generation" to "No More Copy", records the copy control information to the information recording unit 203 (step S503), and outputs the received content C2 to the encryption unit 206 and the conversion unit 205. Note that if the received copy control information indicates "Copy Free", the judgment unit 202 records the copy control information directly to the information recording unit 203 without performing rewriting. Also, the key generation unit 208 generates the content key K 603 (step S504), and the control unit 209 records the content key K 603 to the information recording unit 203 in association with a use flag "1" (step S505).

The conversion unit 205 performs compression conversion on the received content C2 (step S506) to generate the content C4. The conversion unit 205 outputs the generated content C4 to the encryption unit 207.

The encryption unit 207 encrypts the received content C4 to generate encrypted content EC4 (step S507), and records the encrypted content EC4 to the content recording unit 204 (step S508).

Also, the encryption unit 206 encrypts the received content C2 to generate encrypted content EC2 (step S509), and records the encrypted content EC2 to the content recording unit 204 (step S510).

This completes the description of operations for recording the encrypted contents EC2 and EC4 generated by encrypting the content C2 and the post-conversion content C4.

2.2 Transferring the Encrypted Content EC4 to the Memory Card (1) Next is a description of operations when transferring the encrypted content EC4 from the content recording unit 204 to the memory card 104, with reference to FIG. 5.

When instruction information from the input unit 216 indicates a transfer of the encrypted content EC4 to the memory card 104, the judgment unit 210 acquires the copy control information 601 via the read/write unit 211, and judges whether a transfer is possible (step S521). If the judgment result indicates that the encrypted content EC4 is not transferable (step S521:NO), the judgment unit 210 ceases further processing, whereby processing ends.

If the judgment result indicates that the encrypted content EC4 is transferable (step S521:YES), mutual authentication is performed between the authentication unit 212 and the authentication unit 401 of the memory card 104 (step S522). Further processing ceases to be performed and is ended if the authentication result indicates failed authentication (step S523:NO, S524:NO).

Also, if the authentication result indicates successful authentication (step S523:YES, step S524:YES), the authentication unit 212 generates the session key SK1, and outputs the generated session key SK1 to the encryption/decryption unit 213. Similarly to the authentication unit 401 of the memory card 104, the authentication unit 401 also generates the session key SK1 and outputs the generated session key SK1 to the encryption/decryption unit 402.

The read/write unit 211 reads the copy control information 601 and the content key K 603 from the information recording unit 203 (step S525), and outputs the read copy control information 601 and content key 603 to the encryption/decryption unit 213. Also, the control unit 209 sets the use flag to "0" to put the content key K 603 into an unusable state (step S526).

The encryption/decryption unit 213 receives the copy control information 601 and the content key K 603. The encryption/decryption unit 213 also encrypts the copy control information 601 and the content key K 603 with use of the session key SK1, thereby generating the encrypted data D1 (step S527). The encryption/decryption unit 213 outputs the generated encrypted data D1 to the memory card 104.

On receipt of the encrypted data D1, the encryption/decryption unit 402 of the memory card 104 decrypts the received encrypted data D1 with use of the session key SK1, thereby generating the copy control information 601 and the content key K 603 (step S529). The encryption/decryption unit 402 records the generated copy control information 601 and content key 603 to the secure area 404 (step S530).

The control unit 209 of the recording/playback apparatus 102 erases the content key K 603 from the information recording unit 203 (step S531).

The read/write unit 211 reads the encrypted content EC4 from the content recording unit 204, and outputs the read encrypted content EC4 to the memory card 104 (step S532).

The recording control unit 406 receives the encrypted content EC4, and records the received encrypted content EC4 to the data area 405 (step S533).

The control unit 209 erases the encrypted content EC4 from the content recording unit 204 (step S534), and processing ends.

(2) Next is a description of data states in memories when transferring the encrypted content EC4 from the content recording unit 204 to the memory card 104, with reference to FIGS. 6A to 6D and FIGS. 7E and 7F.

FIG. 6A shows data states when transfer processing is commenced. The copy control information 601, the use flag 602, and the content key K 603 are stored in the information recording unit 203 of the recording/playback apparatus 102, and the encrypted content EC2 and the encrypted content EC4 are stored in the content recording unit 204. Note that the use flag 602 is set to "1", which indicates "usable state".

Next, FIG. 6B shows data states when the above-mentioned step S526 has ended. In this state, the use flag 602 is set to "0", which indicates "unusable state", and the content key K 603 cannot be used.

FIG. 6C shows data states when step S530 has ended. In this state, the copy control information 601 and the content key K 603 are stored in the secure area 404 of the memory card 104.

FIG. 6D shows data states when step S531 has ended. In this state, the copy control information 601, the use flag 602 and the content key K 603 have been erased from the information recording unit 203.

FIG. 7E shows data states when step S532 has ended. In this state, the encrypted content EC4 is stored in the data area 405, and the pair consisting of the encrypted content EC4 and the decrypting content key K is not present in the memory card 104.

FIG. 7F shows data states after the encrypted content EC4 has been erased from the content recording unit 204 in step S534.

According to the above operations, a pair consisting of the encrypted content EC4 and content key K for decryption does not exist simultaneously in both the recording/playback apparatus 102 and the memory card 104, which is to say that two sets of the encrypted content EC4 and the decrypting content key K will not exist simultaneously after step S503, i.e. even if the power supply is discontinued after the content key K is copied to the memory card 104 or if the memory card 104 is improperly removed from the recording/playback apparatus 102. Also, no matter when the power supply is discontinued, the content key will not be lost from both the transfer-source and the transfer-destination since the content key K exists on either the recording/playback apparatus 102 or the memory card 104.

Figure 8:
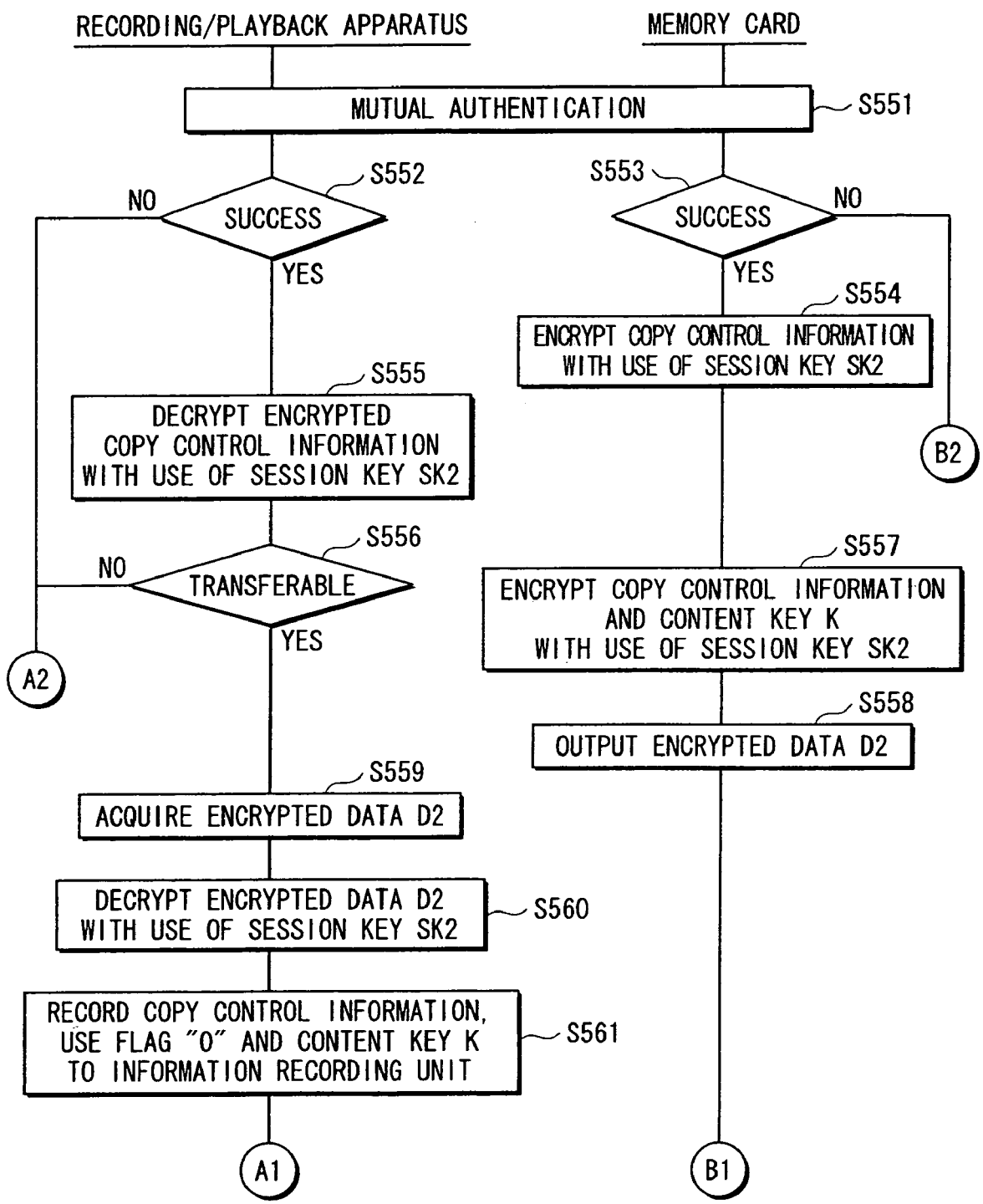
FIG. 8 is a flowchart showing operations in a case of returning the encrypted content EC4 to an original recording/playback apparatus, continuing to FIG. 9.
Figure 9:
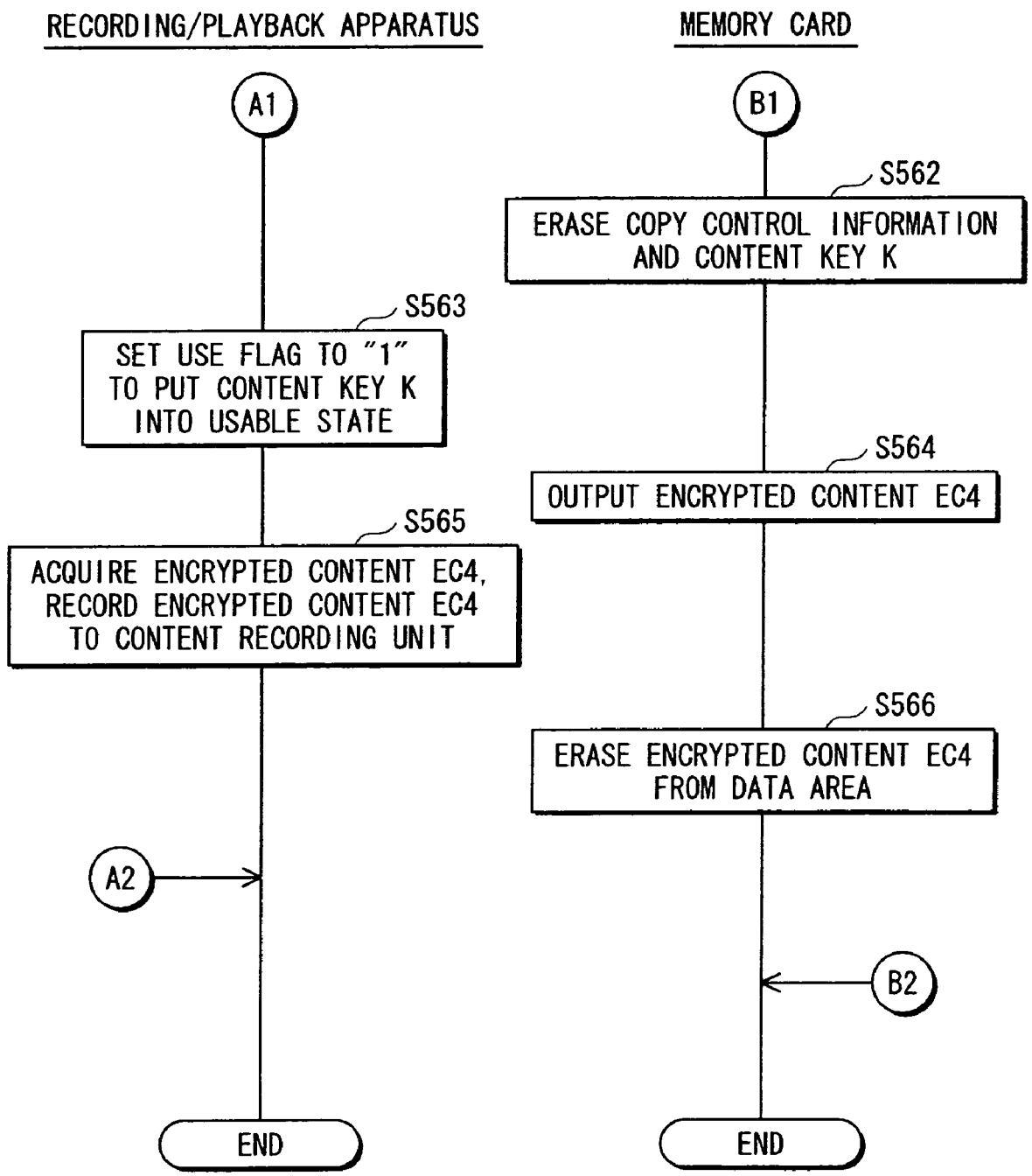
FIG. 9 is a flowchart showing operations in the case of returning the encrypted content EC4 to the original recording/playback apparatus, continued from FIG. 8.

2.3 Transferring the Encrypted Content EC4 to the Original Recording/Playback Apparatus (1) Next is a description of operations for transferring the encrypted content EC4 from the memory card 104 to the content recording unit 204, with reference to FIG. 8 and FIG. 9.

Upon receiving, from the input unit 216, a user operation-generated input indicating the transfer of the encrypted content EC4 from the memory card 104 to the recording/playback apparatus 102, the authentication unit 212 performs mutual authentication with the authentication unit 401 (step S551). If the authentication result indicates failed authentication (step S552:NO, step S553:NO), further processing is cancelled, whereby processing ends.

If the authentication result indicates successful authentication (step S552:YES, step S553:YES), the authentication units 212 and 401 generate respective session keys SK2, and output the generated session keys SK2 to the encryption/decryption unit 213 and the encryption/decryption unit 402.

The encryption/decryption unit 402 of the memory card 104 receives the session key SK2, reads the copy control information from the secure area 404, and encrypts the read copy control information with use of the session keys SK2, thereby generating encrypted copy control information (step S554). The encryption/decryption unit 402 outputs the encrypted copy control information to the recording/playback apparatus 102.

The encryption/decryption unit 213 receives the encrypted copy control information, and uses the session key SK2 to decrypt the encrypted copy control information, thereby generating the copy control information (step S555). The encryption/decryption unit 213 outputs the copy control information to the judgment unit 210.

The judgment unit 210 receives the copy control information via the read/write unit 211, and judges whether the received copy control information indicates transferability (step S556). If the judgment unit 210 judges that the copy control information indicates non-transferability (step S556: NO), further processing is cancelled, whereby processing ends.

If the judgment result is that the copy control information indicates transferability (step S556:YES), further processing is continued. The encryption/decryption unit 402 of the memory card 104 reads the copy control information and the content key K from the secure area, and encrypts the read copy control information and content key K with use of the session key SK2, thereby generating the encrypted data D2 (step S557). The encryption/decryption unit 402 outputs the encrypted data D2 to the recording/playback apparatus 102 (step S558).

Upon receiving the encrypted data D2 (step S559), the encryption/decryption unit 213 decrypt the received encrypted data D2 with use of the session key SK2, thereby generating the copy control information 601 and the content key K 603 (step S560). The encryption/decryption unit 213 records the generated copy control information and content key K 603 and the use flag "0" to the information recording unit 203 (step S561).

The recording control unit 406 of the memory card 104 erases the copy control information 601 and the content key K 603 from the secure area 404 (step S562).

When the content key K is erased from the memory card 104, the control unit 209 sets the use flag to "1" (step S563).

Also, the recording control unit 406 reads the encrypted content EC4 from the data area 405, and outputs the read encrypted content EC4 to the recording/playback apparatus 102 (step S564).

The read/write unit 211 acquires the read encrypted content EC4 from the memory card 104 via the input/output unit 217, and writes the acquired encrypted content EC4 to the content recording unit 204 (step S565).

The recording control unit 406 erases the encrypted content EC4 from the data area 405 (step S566).

(2) Next is a description of states of data in memories when transferring the encrypted content EC4 from the memory card 104 to the content recording unit 204, with reference to FIGS. 10A to 10D and FIGS. 11E and 11F.

FIG. 10A shows data states when processing has commenced. Nothing is stored in the information recording unit 203, whereas the encrypted content EC2 is stored in the content recording unit 204. Also, the copy control information 601 and the content key K 603 are stored in the secure area 404 of the memory card 104, and the encrypted content EC4 is stored in the data area 405.

Next, FIG. 10B shows data states when step S561 has ended, where the copy control information 601, the use flag "0" and the content key K 603 have been written to the information recording unit 203. The content key K 603 cannot be used at this time since the use flag is set to "0".

Also, FIG. 10C shows data states in which the copy control information and the content key K have been erased from the secure area 404 in step S562.

FIG. 10D shows data states in which the use flag is set to "1" in step S563, putting the content key K into the "usable state".

FIG. 11E shows data states in which the encrypted content EC4 has been read from the data area 405 and written to the content recording unit 204 in step S564.

FIG. 11F shows data states in which the encrypted content EC4 has been erased from the data area 405 in step S566.

This completes the transfer of the encrypted content EC4. According to these operations, similarly to the above-mentioned case of transfer in (1), two sets consisting of the encrypted content EC4 and the content key K do not exist simultaneously, nor would the content key K be lost even if the power supply is discontinued.

2.3 Content Playback

Figure 12:
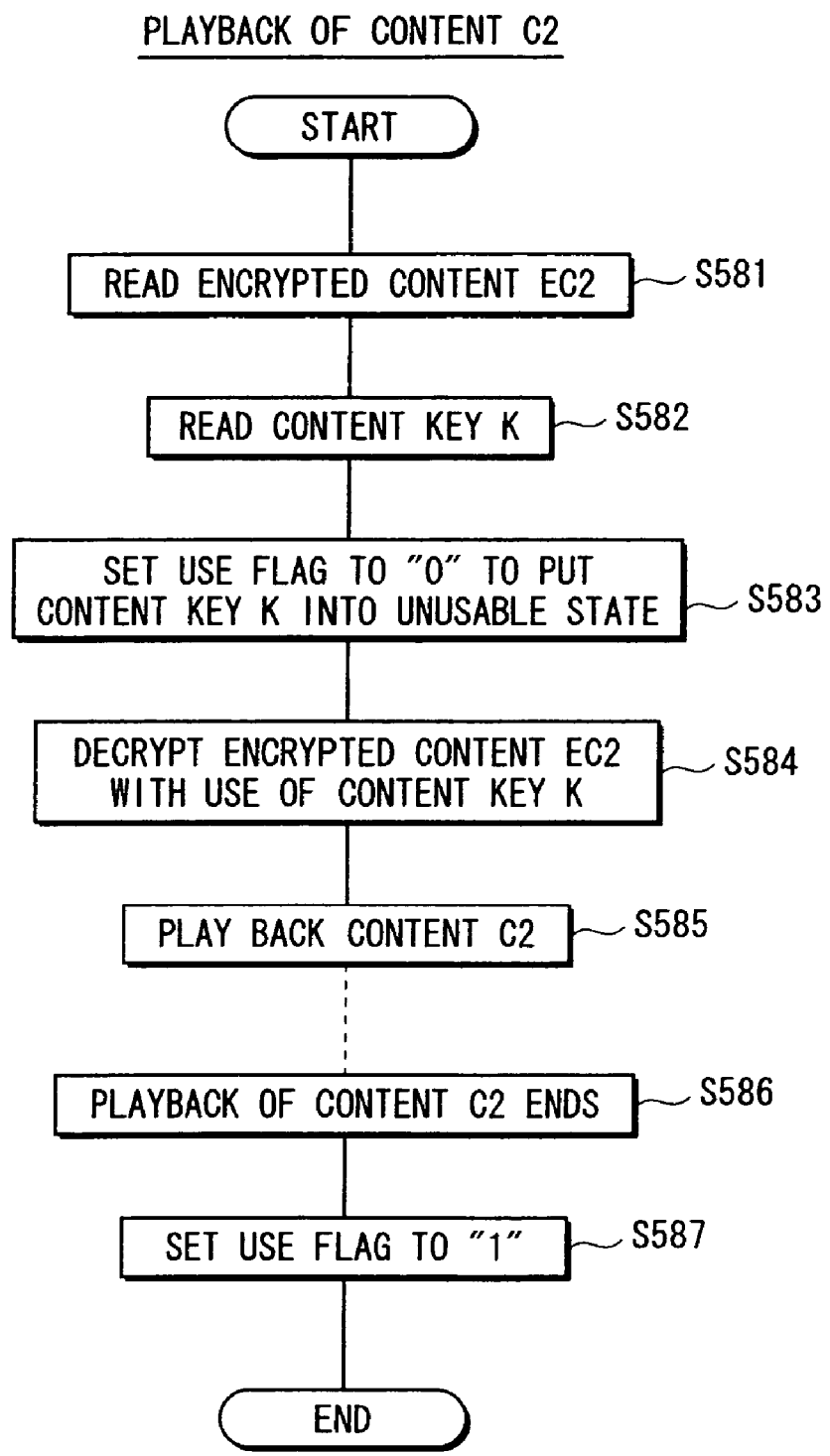
FIG. 12 is a flowchart showing operations in a case of playing back the content C2.

Next is a description of operations when playing back the encrypted content EC2, with reference to FIG. 12.

In accordance with user input received by the input unit 216, the decryption unit 214 reads the encrypted content EC2 from the content recording unit 204 (step S581), and reads the content key K 603 from the information recording unit 203 (step S582).

When the content key K 603 is read, the control unit 209 sets the use flag 602 to "0", thereby putting the content key K 603 into the "unusable state" (step S583).

The decryption unit 214 decrypts the encrypted content EC2 with use of the content key K 603, thereby generating the content C2 (step S584). The decryption unit 214 outputs the decrypted content C2 to the playback unit 215.

The playback unit 215 generates video signals and audio signals from the content C2, and outputs the video and audio signals to the monitor 12 and the speaker 13 to play back the content C2 (step S585).

Also, when playback of the content C2 ends (step S586), the control unit 209 sets the use flag to "1" to put the content key K 603 into the "usable state" (step S587).

Second Embodiment

Next is a detailed description of a second embodiment of the present invention using the drawings.

3. Structure of a Copyrighted Work Protection System 1b

Figure 13:
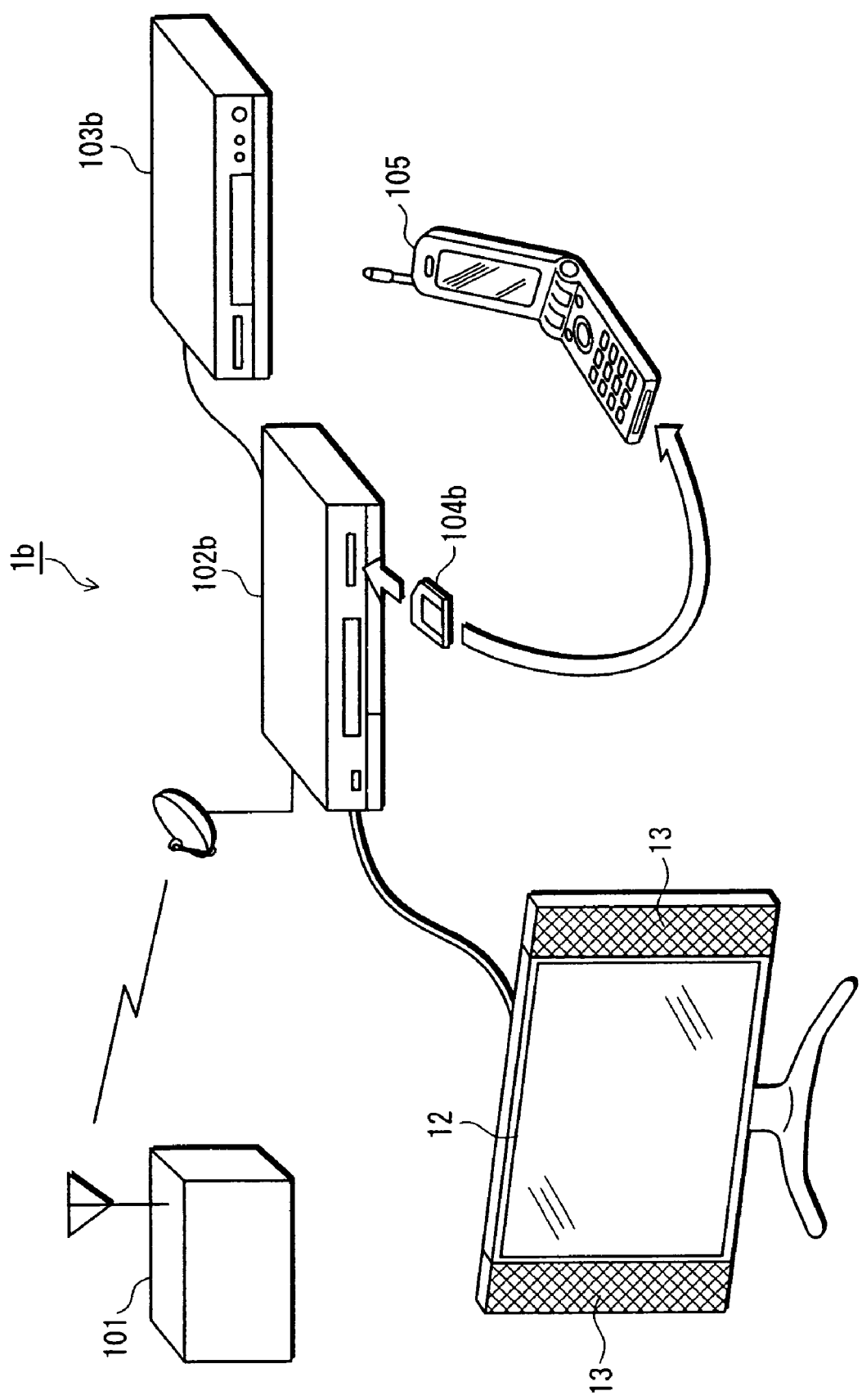
FIG. 13 shows an overall structure of a copyrighted work protection system 1b of a second embodiment.

As shown in FIG. 13, a copyrighted work protection system 1b includes a content supply apparatus 101, a recording/playback apparatus 102b, a recording/playback apparatus 103b, a memory card 104b, a mobile device 105, a monitor 12 and a speaker 13.

Similarly to the first embodiment, the recording/playback apparatus 102b is connected to the monitor 12 and the speaker 13, and can output a content C2 for viewing.

Whereas the content key K was used to encrypt the content C2 and the converted content C4 in the copyrighted work protection system 1 of the first embodiment, the second embodiment describes a case in which these contents are encrypted using separates keys.

The following describes differences from the first embodiment.

3.1 Recording/Playback Apparatus 102b

Figure 14:
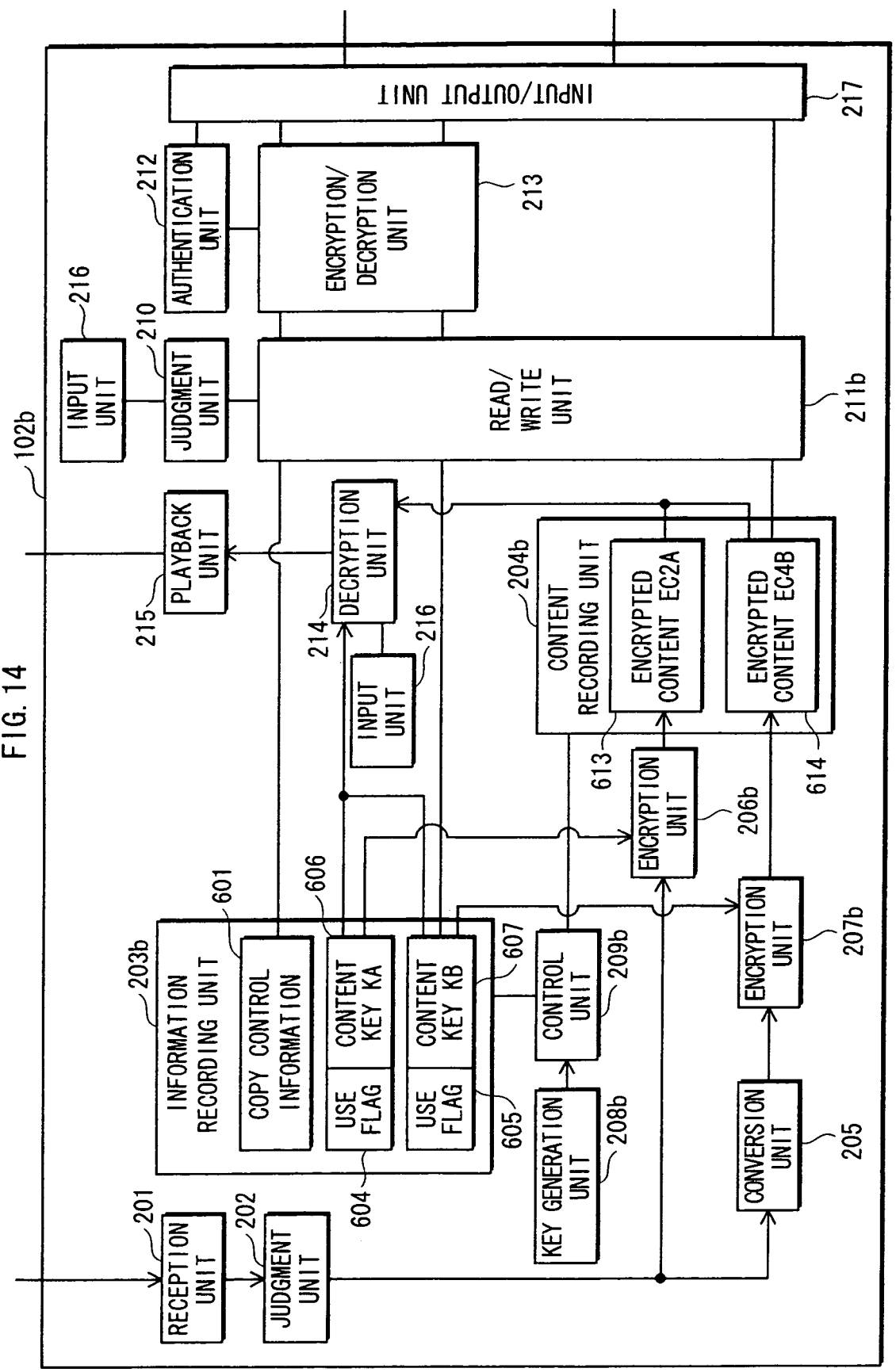
FIG. 14 is a block diagram showing a structure of a recording/playback apparatus 102b.

As shown in FIG. 14, the recording/playback apparatus 102b includes a reception unit 201, a judgment unit 202, an information recording unit 203b, a content recording unit 204b, a conversion unit 205, an encryption unit 206b, an encryption unit 207b, a key generation unit 208b, a control unit 209b, a judgment unit 210, a read/write unit 211b, an authentication unit 212, an encryption/decryption unit 213, a decryption unit 214, a playback unit 215, an input unit 216 and an input/output unit 217.

Note that descriptions of the reception unit 201, the judgment unit 202, the conversion unit 205, the judgment unit 210, the read/write unit 211b, the authentication unit 212, the encryption/decryption unit 213, the decryption unit 214, the playback unit 215, the input unit 216 and the input/output unit 217 have been omitted since they have the same structures as in the first embodiment.

(1) Key Generation Unit 208b

The key generation unit 208b generates a content key KA and a content key KB. The content keys KA and KB are different pieces of key data, and the content key KA is used in the encryption and decryption of the content C2, while the content key KB is used in the encryption and decryption of the converted content C4.

The key generation unit 208b generates and outputs a content key KA 606 and a content key KB 607 to the control unit 209b.

(2) Control Unit 209b

On receipt of the content keys KA and KB, the control unit 209b records the received content keys KA and KB as the content keys KA 606 and KB 607, in association with use flags 604 and 605 respectively. In this case, the use flags 604 and 605 are set to "1".

Also, while transferring an encrypted content EC4B to the memory card 104b, the control unit 209b sets the use flags 604 and 605 to "0" when the read/write unit 211b reads the content key KB 605, to put the content keys KA and KB in an unusable state.

Also, in the case of transferring the encrypted content EC4B from the memory card 104b to the recording/playback apparatus 102b, the control unit 209b receives the content key KB from the memory card 104b, and records the received content key KB to the information recording unit 203b in association with the use flag 605 set to "0". When the content key KB is erased from the memory card 104b, the control unit 209b sets the use flags 604 and 605 to "1" to put the content keys KA and KB in the usable state.

(3) Information Recording Unit 203b

The information recording unit 203b includes an area for storing copy control information 601, the content key KA 606 and the content key KB 607. The information recording unit 203b stores the content key KA 606 in association with the use flag 604, and the content key KB 607 in association with the use flag 605.

(4) Encryption Units 206b and 207b

The encryption unit 206b performs encryption processing with respect to the content C2. The encryption unit 206b reads the content key KA 606 from the information recording unit 203b, and performs an encryption algorithm E1 on the content C2 with use of the content key KA 606, thereby generating encrypted content EC2A. The encryption unit 206b records the generated encrypted content EC2A to the content recording unit 204b.

The encryption unit 207b performs encryption processing with respect to the content C4 that was generated by conversion by the conversion unit 205. The encryption unit 207b reads the content key KB 607 from the information recording unit 203b, and performs the encryption algorithm E1 on the content C4 with use of the content key KB 607, thereby generating encrypted content EC4B. The encryption unit 207b records the generated encrypted content EC4B to the content recording unit 204b.

(5) Content Recording Unit 204b

The content recording unit 204b includes an area for storing encrypted content EC2A 613 and encrypted content EC4B 614.

3.2 Memory Card 104b

Figure 15:
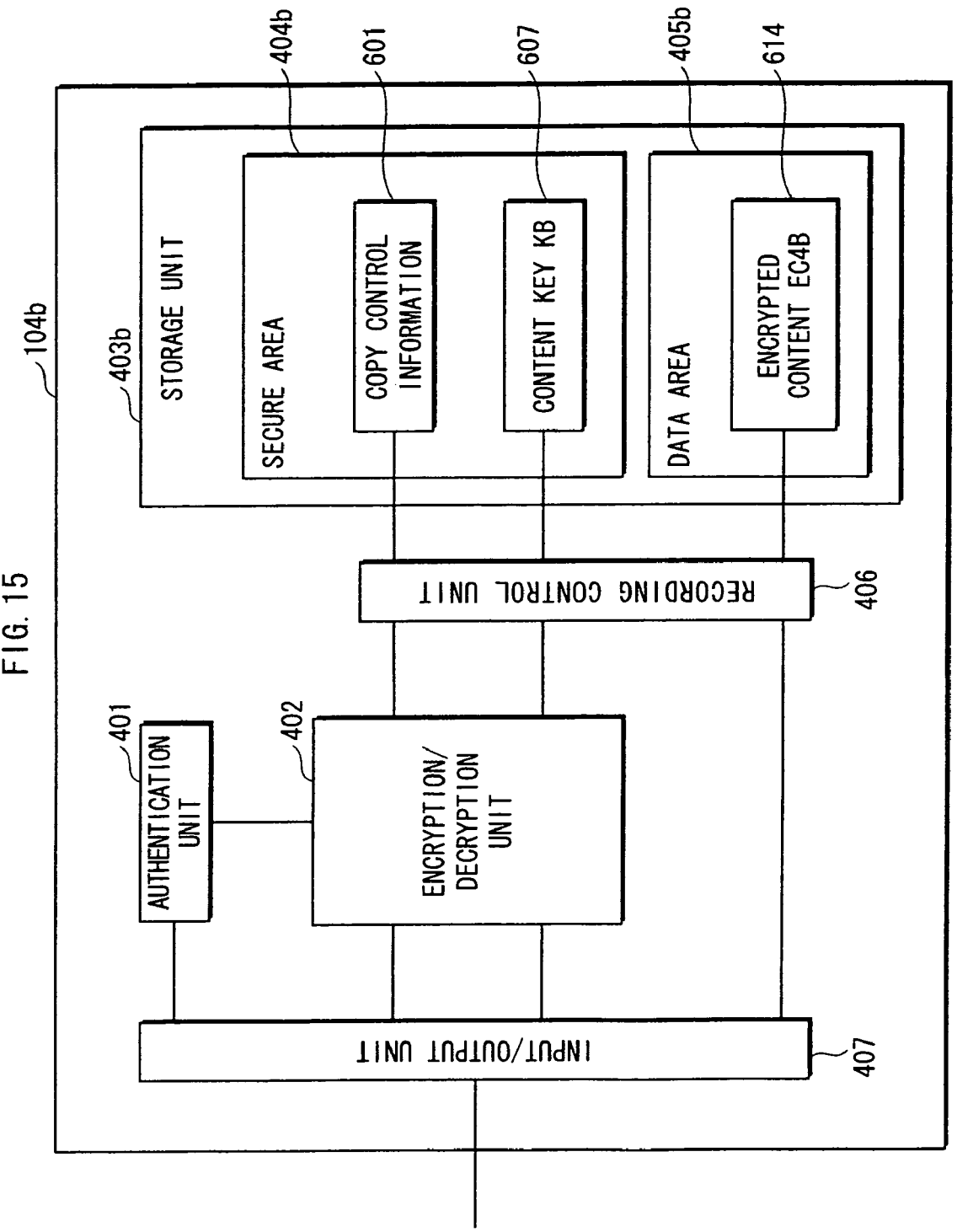
FIG. 15 is a block diagram showing a structure of a memory card 104b.

As shown in FIG. 15, the memory card 104b includes an authentication unit 401, an encryption/decryption unit 402, a storage unit 403b, a recording control unit 406 and an input/output unit 407.

Note that descriptions of the input/output unit 407, the recording control unit 406, the authentication unit 401 and the encryption/decryption unit 402 have been omitted since they have the same structures as in the first embodiment.

The storage unit 403b includes a secure area 404b and a data area 405b.

The secure area 404b includes an area for storing the copy control information 601 and the content key KB 607.

The data area 405B includes an area for storing the encrypted content EC4B 614.

4. Operations of the Copyrighted Work Protection System 1b 4.1 Reception of the Content C2

Figure 16:
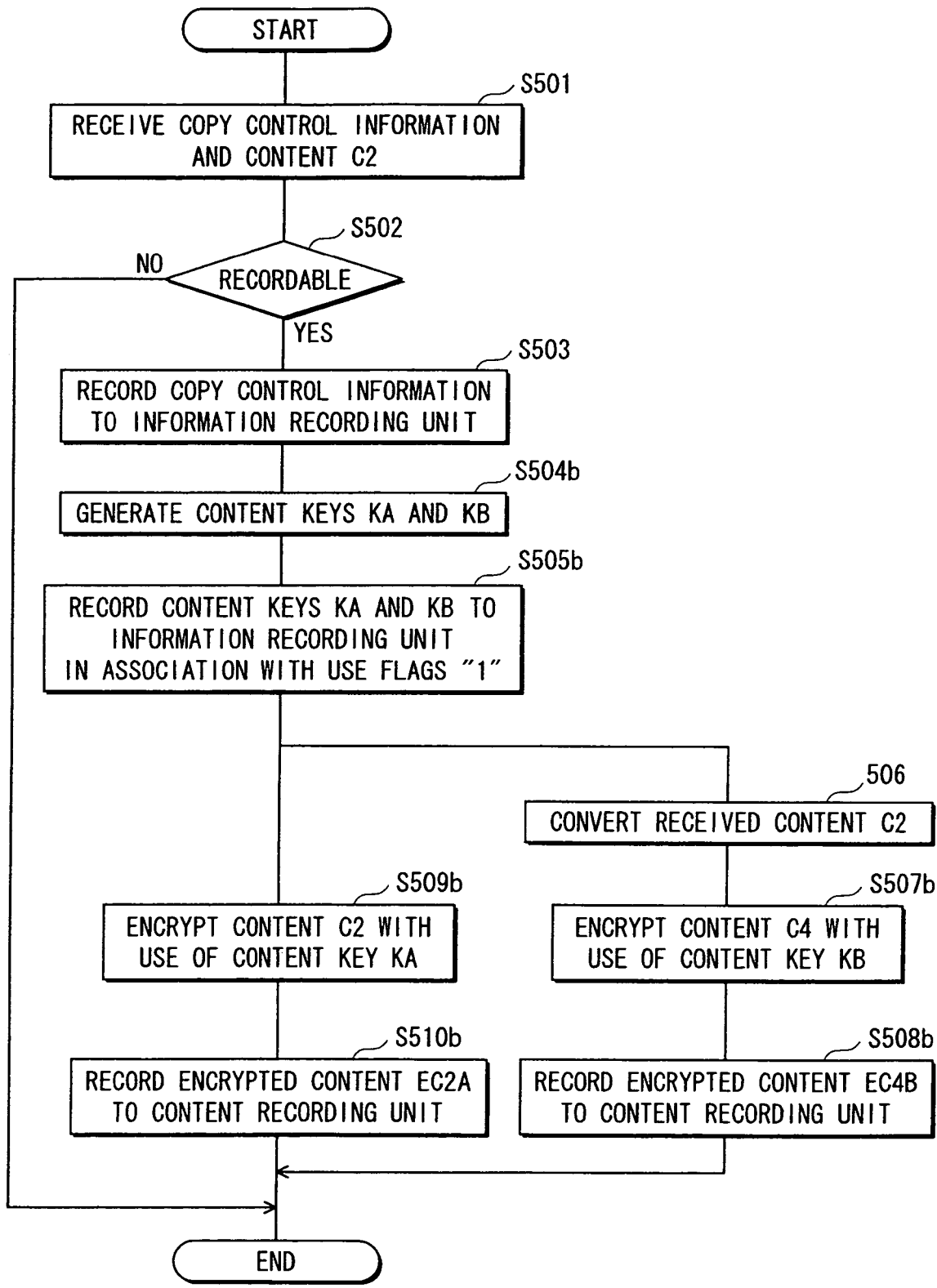
FIG. 16 is a flowchart showing operations in a case of recording the content C2.

The following describes operations for receiving and recording the content C2, with reference to FIG. 16.

Note that in FIG. 16, processing that is the same as in the first embodiment has been given the same numerical references. The same follows for the other figures.

Steps S501 to S503 are the same as in the first embodiment, and thereafter the key generation unit 208b generates the content keys KA and KB (step S504b), and the control unit 209b records the content keys KA and KB to the information recording unit 203b in association with use flags set to "1" (step S505b).

The conversion unit 205 converts the content C2 to generate the content C4 (step S506), and outputs the generated content C4 to the encryption unit 207b. The encryption unit 207b reads the content key KB from the information recording unit 203b, and encrypts the content C4 with use of the content key KB, thereby generating the encrypted content EC4B (step S507b). The encryption unit 207b records the generated encrypted content EC4B to the content recording unit 204b (step S508b).

Also, the encryption unit 206b reads the content key KA from the information recording unit 203b, and encrypts to the content C2 with use of the read content key KA, thereby generating the encrypted content EC2A (step S509b). The encryption unit 206b records the generated encrypted content EC2A to the content recording unit 204b.

4.2 Transferring the Encrypted Content EC4B to the Memory Card 104

(1) The following describes operations when transferring the encrypted content EC4B to the memory card 104, with reference to FIG. 17.

Steps S521 to S524 are the same processing as in the first embodiment, and thereafter the read/write unit 211b reads the copy control information 601 and the content key KB (step S525b).

Also, the control unit 209b sets the use flags 604 and 605, which correspond to the content keys KA and KB, to "0" in order to put the content keys KA and KB into an unusable state (step S526b).

Also, the encryption/decryption unit 213 encrypts the copy control information and the content key KB with use of the session key SK1, thereby generating encrypted data D1b (step S527b), and outputs the encrypted data D1b to the memory card 104b (step S528b).

Similarly, the encryption/decryption unit 402b of the memory card 104b decrypts the encrypted data D1b with use of the session key SK1, thereby generating the copy control information and the content key KB (step 529b). The generated copy control information and content key KB are then recorded to the secure area 404b (step S530b).

The control unit 209 erases the copy control information 601 and the content key KB (step S531b).

The read/write unit 211b reads the encrypted content EC4B from the content recording unit 204b, and outputs the encrypted content EC4B to the memory card 104b via the input/output unit 217 (step S532b).

The recording control unit 406 receives the encrypted content EC4B, and records the received encrypted content EC4B to the data area 405b (step S533b).

Also, the control unit 209 erases the encrypted content EC4B from the content recording unit 204b (step 534b).

(2) The following describes a transfer of data in memories in the case of transferring the above-mentioned encrypted content EC4B to the memory card 104b, with reference to FIGS. 18A to 18D and FIGS. 19E and 19F. Note that FIGS. 18A to 18D and FIGS. 19E and 19F show the information recording unit 203b and the content recording unit 204b of the recording/playback apparatus 102b, and the secure area 404b and the data area 405b of the memory card 104b, as well as data recorded in each of these.

Figure 18A:
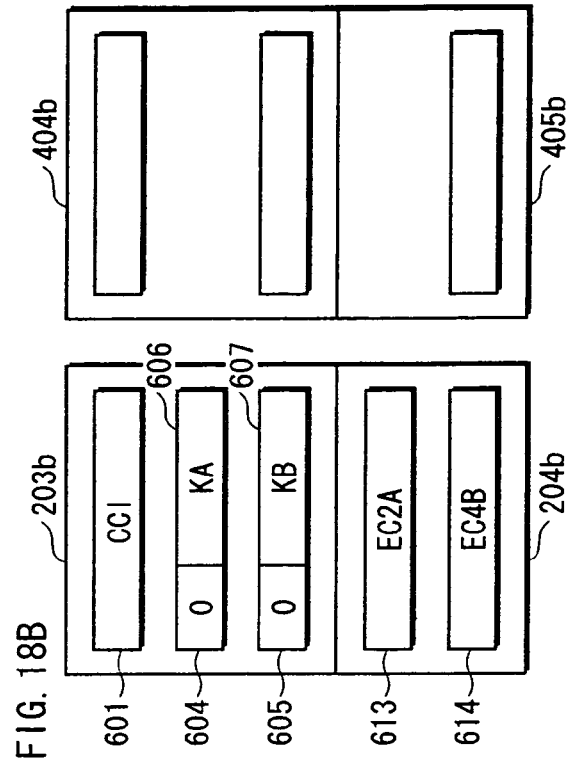
FIGS. 18A to 18D show states of data in recording areas in the case of transferring the encrypted content EC4B, continuing to FIGS. 19E and 19F.

FIG. 18A shows data states when transfer processing is commenced. The copy control information 601, the use flag 604, the content key KA 606, the use flag 605 and the content key KB 607 are stored in the information recording unit 203b. The encrypted content EC4B 614 and the encrypted content EC2A 613 are stored in the content recording unit 204b.

Figure 18B:
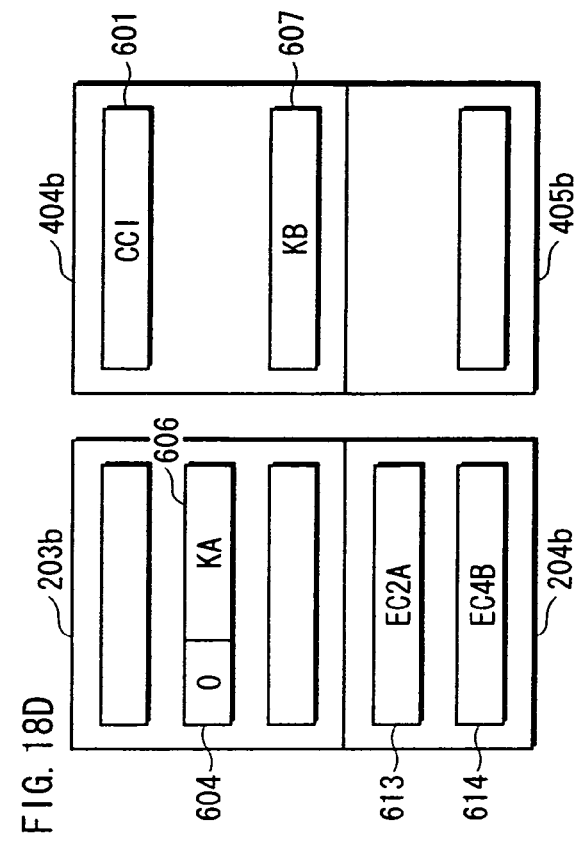

In FIG. 18B, the use flags 604 and 605 have been changed to "0". As a result, both the content keys KA 606 and KB 607 are in an unusable state.

Figure 18C:
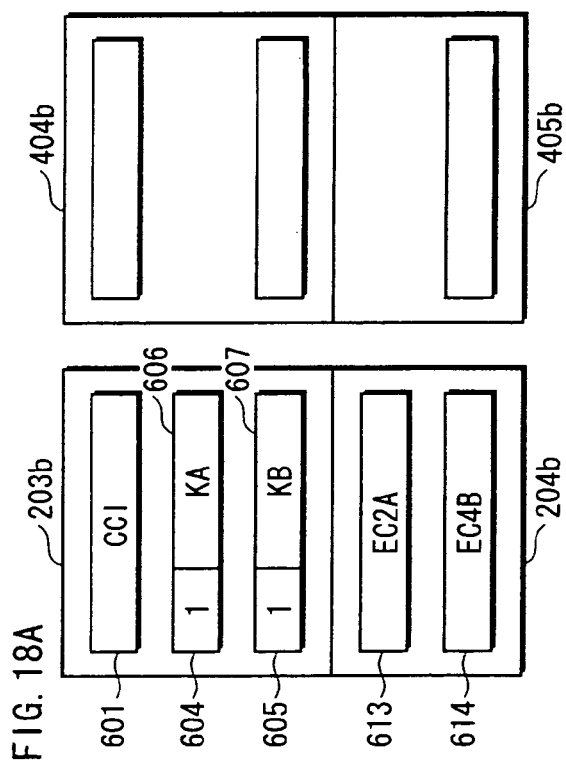

In FIG. 18C, the copy control information 601 and the content key KB 614 are stored in the secure area 404b.

Figure 18D:
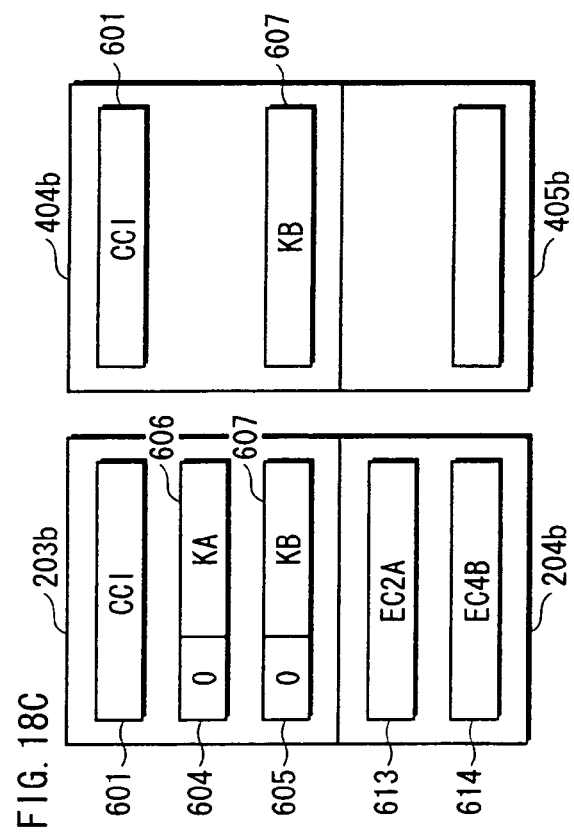

In FIG. 18D, the copy control information 601 and the content key KB 607 have been erased from the information recording unit 203b.

In FIG. 19E, the encrypted content EC4B 614 is stored in the data area 405b. In this state, a usable set of content and a key does not exist in the recording/playback apparatus 102b.

In FIG. 19F, the encrypted content EC4B 614 has been erased from the information recording unit 204b, and the transfer is complete.

As a result, similarly to a transfer in the first embodiment, there are never 2 sets of encrypted content and content keys usable for decrypting the content, nor will the content keys be lost even if the power supply is interrupted.

Figure 20:
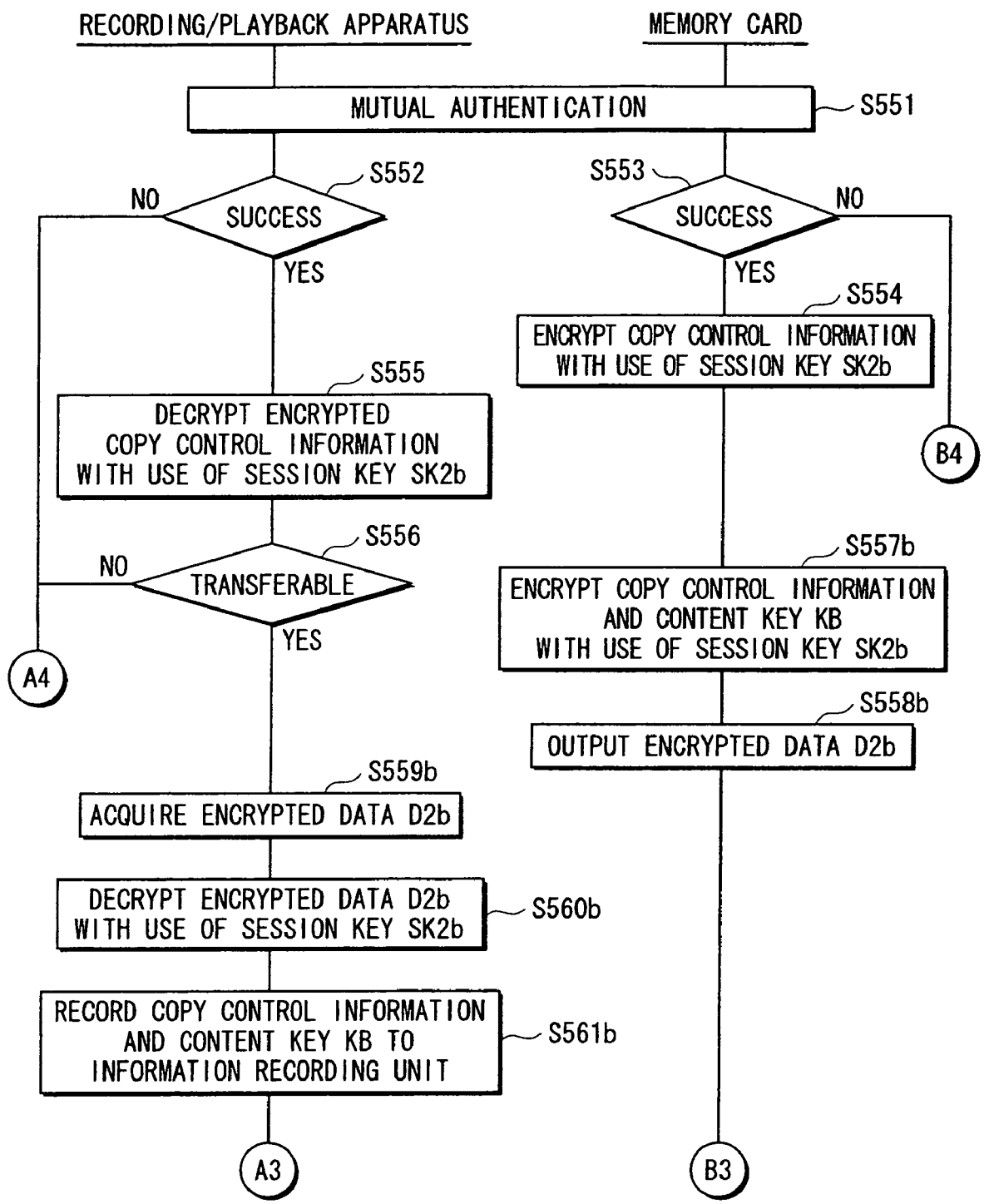
FIG. 20 is a flowchart showing operations in a case of returning the encrypted content EC4B to an original recording/playback apparatus, continuing to FIG. 21.
Figure 21:
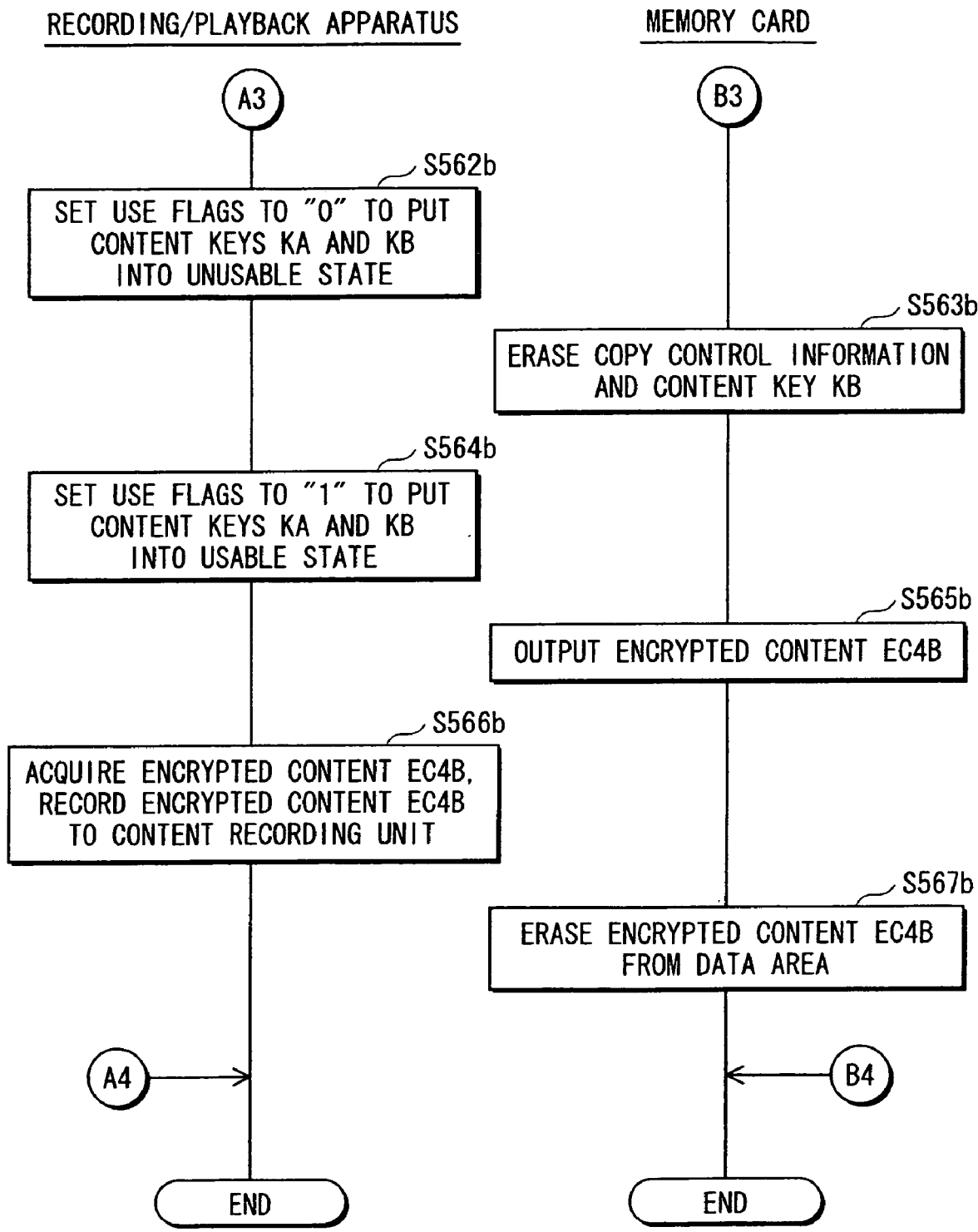
FIG. 21 is a flowchart showing operations in the case of returning the encrypted content EC4B to the original recording/playback apparatus, continued from FIG. 20.

4.3 Transferring the Encrypted Content EC4B Back to the Recording/Playback Apparatus 102b (1) The following describes operations in the case of transferring the encrypted content EC4B from the memory card 104b to the recording/playback apparatus 102b to return the encrypted content EC4B to its original state, with references to FIGS. 20 and 21.

Steps S551 to S556 show the same processing as in the first embodiment.

If the content is transferable (step S556:YES), the encryption/decryption unit 402b reads the copy control information and the content key KB from the secure area 404b, and encrypts the read copy control information and content key KB with use of the session key SK2, thereby generating encrypted data D2b (step S557b). The encryption/decryption unit 402b outputs the generated encrypted data D2b to the recording/playback apparatus (step S558b).

The encryption/decryption unit 213 acquires the encrypted data D2b (step S559b), and decrypts the encrypted data D2b with use of the session key SK2, thereby generating the copy control information and the content key KB (step S560b).

The read/write unit 211b writes the generated copy control information and content key KB to the information recording unit 213b (step S561b).

Also, at this time the control unit 209b sets the use flags 604 and 605 to "0" to put the content keys into an unusable state (step S562b).

The recording control unit 406b erases the copy control information 601 and the content key KB from the secure area 404b (step S563b).

The control unit 209b sets the use flags 604 and 605 to "1" to put the content keys into a usable state (step S564b).

The recording control unit 406b reads the encrypted content EC4B from the data area 405b, and outputs the encrypted content EC4B to the recording/playback apparatus 102b via the input/output unit 407 (step S565b).

Also, the read/write unit 211b acquires the encrypted content EC4B, and writes the acquired encrypted content EC4B to the content recording unit 204b (step S566b).

The recording control unit 406b erases the encrypted content EC4B from the data area 405b (step S567b).

(2) The following describes states of data in memories in a case of transferring the encrypted content EC4B to the recording/playback apparatus, with reference to FIGS. 22A to 22D and FIGS. 23E and 23F.

Figure 22:
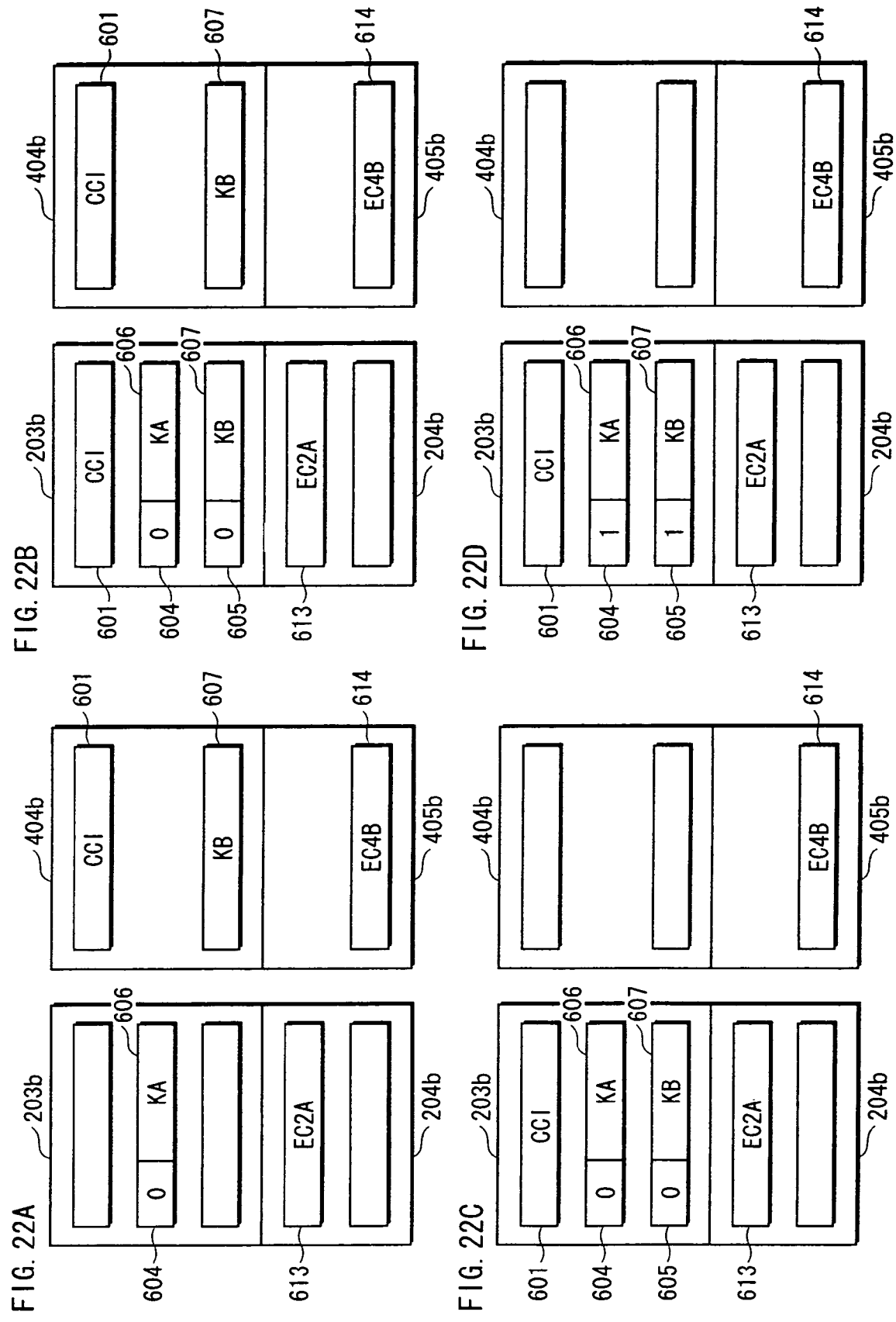
FIGS. 22A to 22D show states of data in recording areas in the case of returning the encrypted content EC4 to the original recording/playback apparatus, continuing to FIGS. 23E and 23F.

In FIG. 22A, the copy control information 601 and the content key KB 607 are stored in the secure area 404b of the memory card 104b, and the encrypted content EC4B 614 is stored in the data area 405b. Also, the content key KA 606 is stored in the information recording unit 203b of the recording/playback apparatus 102b, but cannot be used since the use flag 604 is set to "0". Furthermore, the encrypted content EC2A 613 is stored in the content recording unit 204b. The encrypted content EC2A 613 can neither be decrypted nor viewed since the content key KA 606 is unusable.

In FIG. 22B, the copy control information 601 and the content key KB 607 are stored in the information recording unit 203b. However, neither of the keys can be used since the use flags 604 and 605 are set to "0".

In FIG. 22C, the copy control information 601 and the content key KB 607 have been erased from the secure area 404b. As a result, a viewable set of a content and key does not exist in the memory card 104b.

In FIG. 22D, the use flags 604 and 605 have been changed to "1". As a result, the content keys KA 606 and KB 607 are usable.

Figure 23:
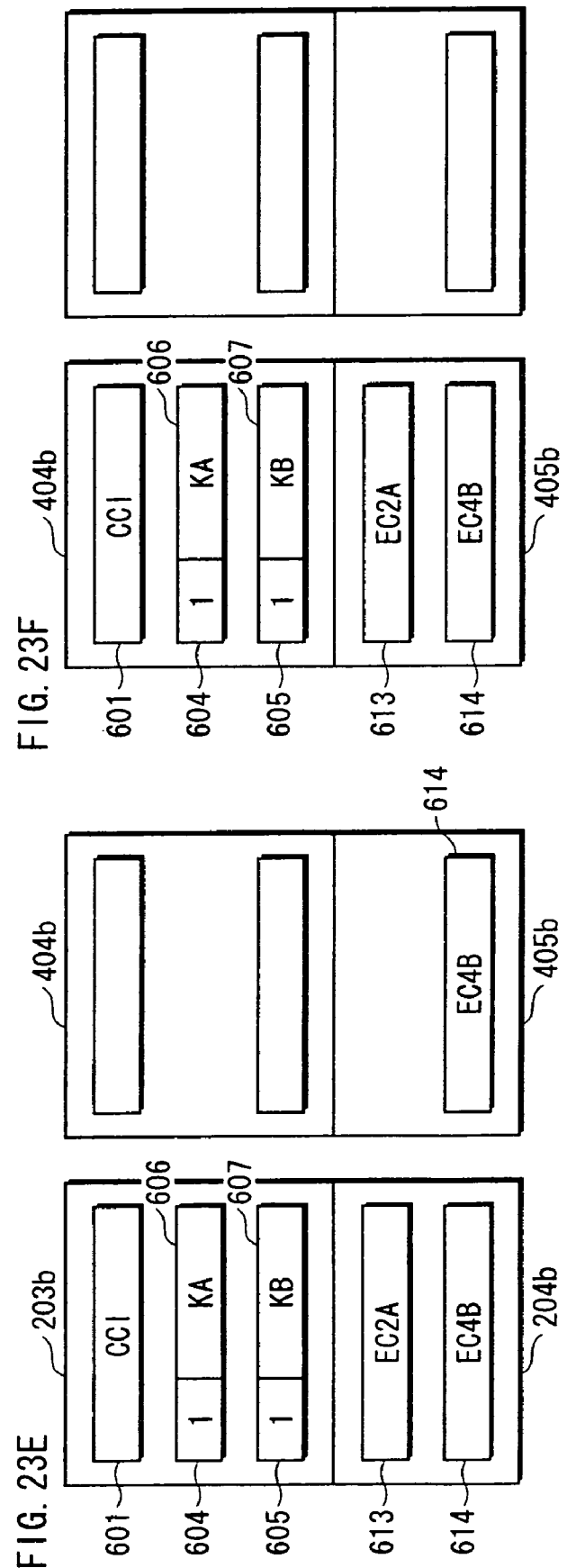
FIG. 23 show states of data in recording areas in the case of returning the encrypted content EC4 to the original recording/playback apparatus, continued from FIGS. 22A to 22D.

In FIG. 23E, the encrypted content EC4B 614 is stored in the content recording unit 204b.

In FIG. 23F, the encrypted-content EC4B 614 has been erased from the data area 405b, and processing for transferring the encrypted content EC4B 614 is complete.

4.4 Playback of the Content C2

Figure 24:
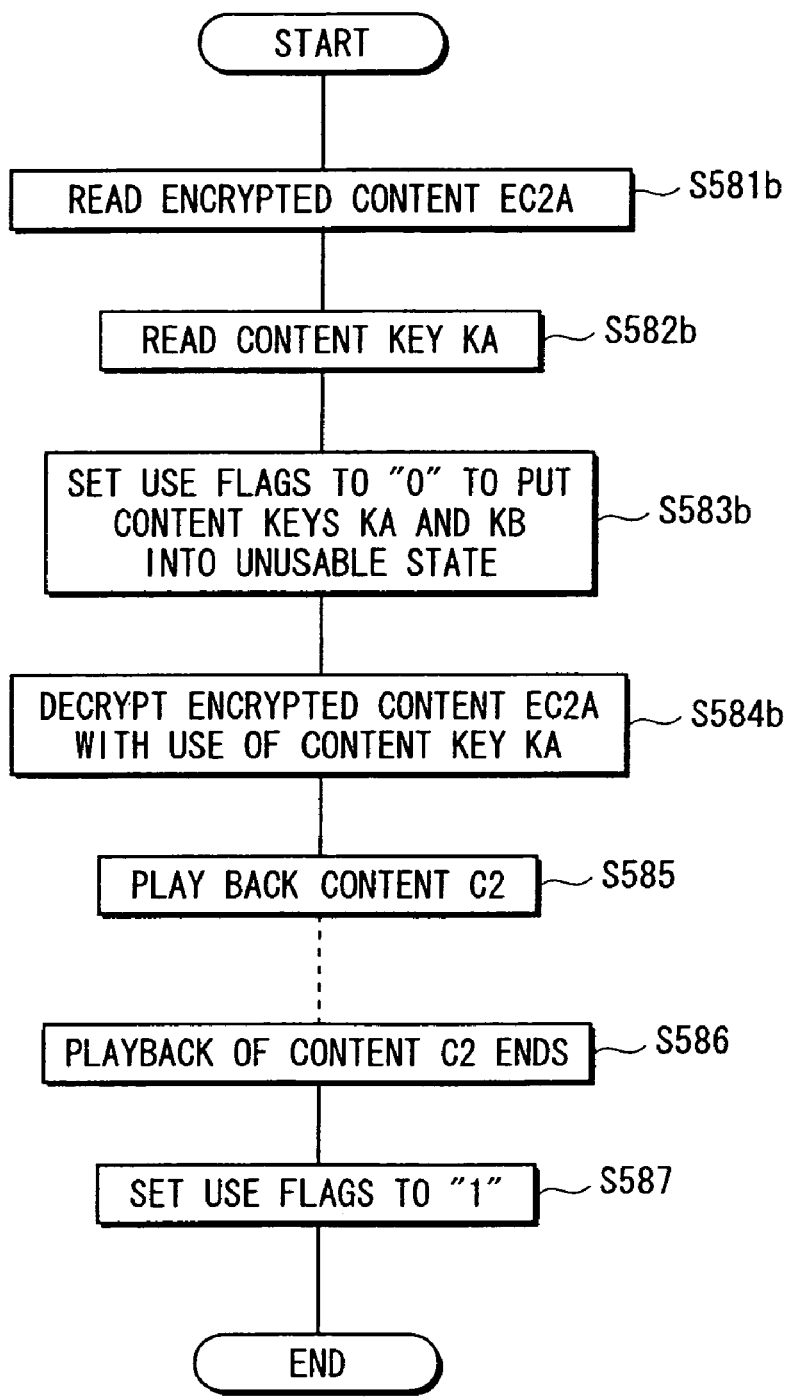
FIG. 24 is a flowchart showing operations in a case of playing back the encrypted content EC2.

Next is a description of operations in the case of playing back the content C2, with reference to FIG. 24.

The decryption unit 214 reads the encrypted content EC2A from the content recording unit 204b (step S581b), and reads the content key KA from the information recording unit 203b (step S582b).

The control unit 209b sets the use flags 604 and 605 to "0" to put the content keys KA and KB into an unusable state (step S583b).

The decryption unit 214 decrypts the encrypted content EC2A with use of the content key KA, thereby generating the content C2 (step S584b). The decryption unit 214 outputs the generated content C2 to the playback unit 215.

The playback unit 215 performs playback processing with respect to the content C2 (step S585). When the playback processing by the playback unit 215 ends (step 586), the control unit 209b sets the use flags 604 and 605 to "1" to put the content keys KA and KB into a usable state.

Playback of the content C2 is performed as described above. When the content C2 is played back in such a way, setting the use flags to "0" makes it impossible to simultaneously use both contents, while playback of one of the contents is possible.

5. Other Variations

Note that although described based on the above embodiments, the present invention is of course not limited to the above-mentioned embodiments. The present invention also includes the following cases.

(1) Although the control unit 209 of the recording/playback apparatus 102 controls the usable or unusable state of the content keys K using the use flags in the first embodiment, the recording control unit 406 of the memory card 104 may control the use flags and record the use flags in association with the content keys K stored in the secure area.

Figure 25:
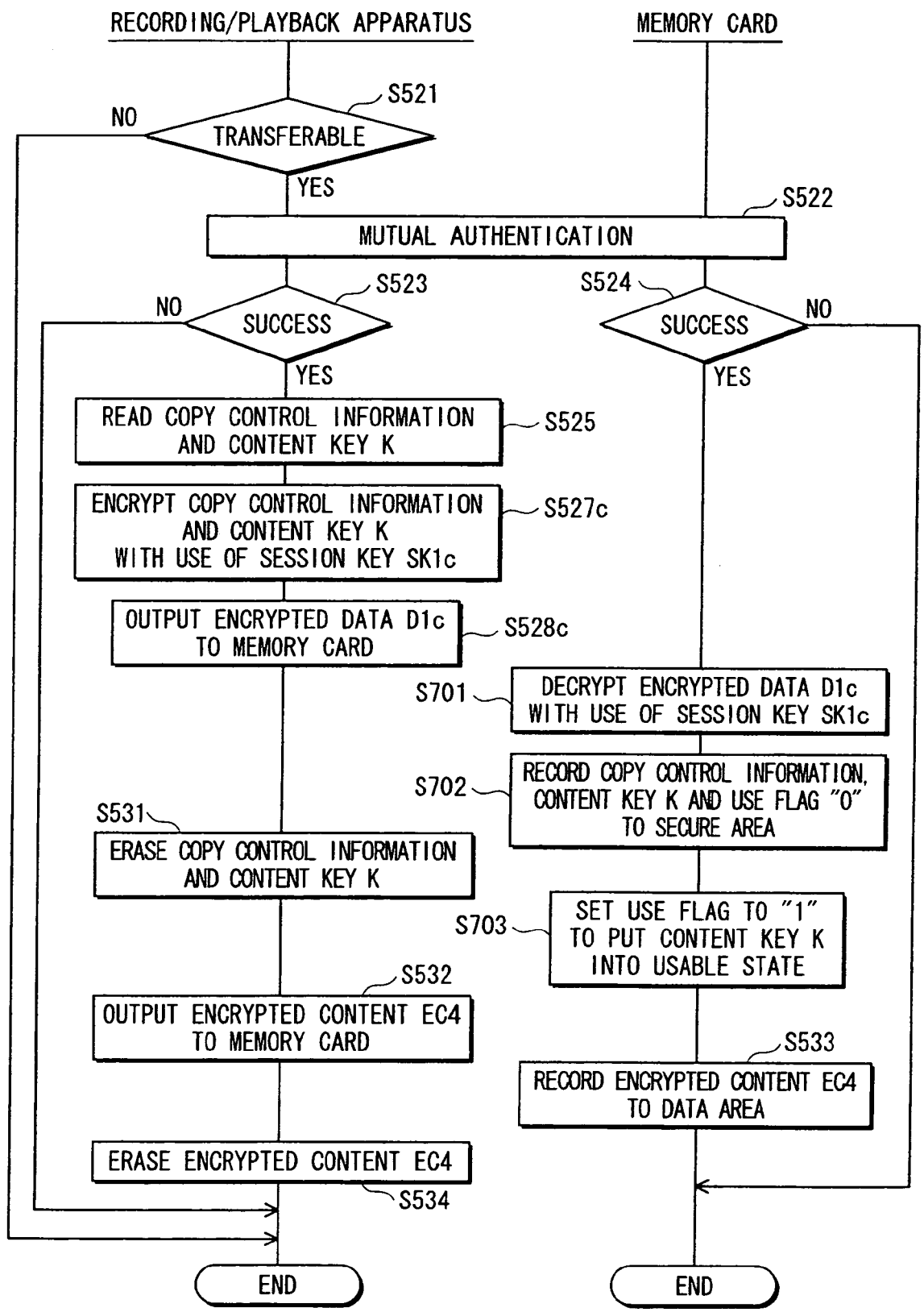
FIG. 25 is a flowchart showing operations of transferring the encrypted content EC4 in a case of use flags being controlled in the memory card 104.

(a) The following describes operations in the case of the recording control unit 406 of the memory card 104 controlling the use flags, with reference to FIG. 25.

Steps S521 to 525 show the same processing as in the first embodiment.

The encryption/decryption unit 213 encrypts the copy control information and the content keys K with use of a session key SK2c that was shared by mutual authentication in step S522, thereby generating encrypted data D1c (step S527c), and outputs the generated encrypted data D1c to the memory card 104 (step S528c).

The encryption/decryption unit 402 of the memory card 104 decrypts the encrypted data D1c with use of a session key SK1c, thereby generating the copy control information and the content keys K (step S701). The encryption/decryption unit 402 records the generated copy control information and content keys K to the secure area 404. At this time, the recording control unit 406 records the content keys K in association with use flags set to "0" (step S702).

The recording/playback apparatus 102 erases the copy control information 601 and the content key K 603 (step S531).

The recording control unit 406 of the memory card 104 sets the use flags to "1" to put the copy control information 601 and the content key K 603 into a usable state (step S703).

Thereafter, similarly to the first embodiment, the read/write unit 211 reads and outputs the encrypted content EC4 from the content recording unit 204 (step S532), and the recording control unit 406 of the memory card 104b writes the encrypted content EC4 to the data area 405 (step S533).

Also, the control unit 209 of the recording/playback apparatus 102 erases the encrypted content EC4 from the content recording unit 204 (step S534).

The encrypted content EC4 is transferred to the memory card 104 as described above. The following describes states of data in the recording areas in this case, with reference to FIGS. 26A to 26D and FIGS. 27E and 27F.

Figure 26:
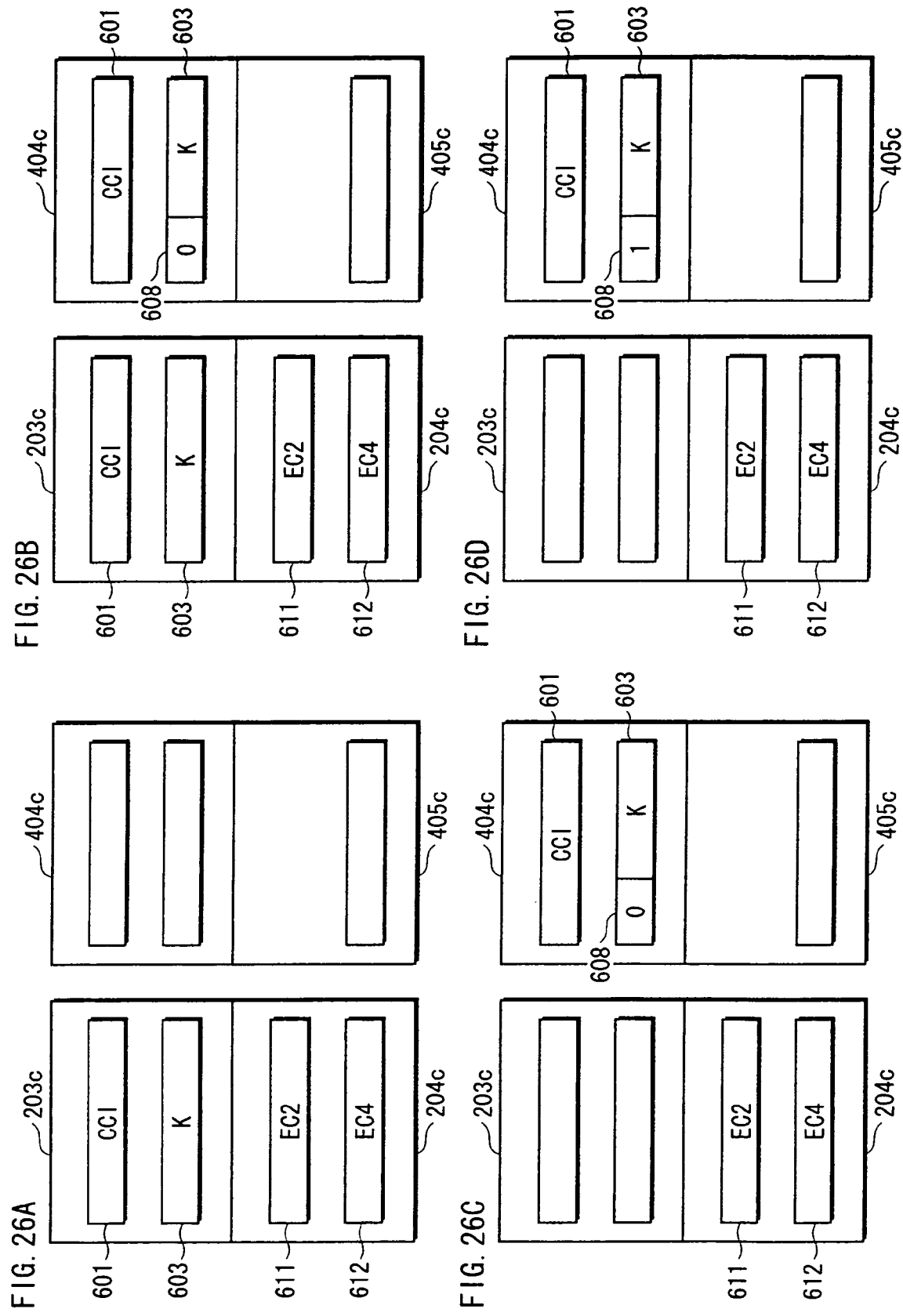
FIGS. 26A to 26D show states of data in recording areas in the above case, continuing to FIGS. 27E and 27F.

FIG. 26A shows data states when processing has commenced, where the copy control information 601 and the content key K 603 are stored in the information recording unit 203, and the encrypted content EC2 611 and EC4 612 are stored in the content recording unit 204.

FIG. 26B shows data states when step S702 has ended. The copy control information 601, a use flag 608 set to "0" and the content key K 603 are stored in the secure area 404 of the memory card 104.

FIG. 26C shows data states when step S531 has ended.

FIG. 26D shows data states when step S703 has ended.

Figure 27:
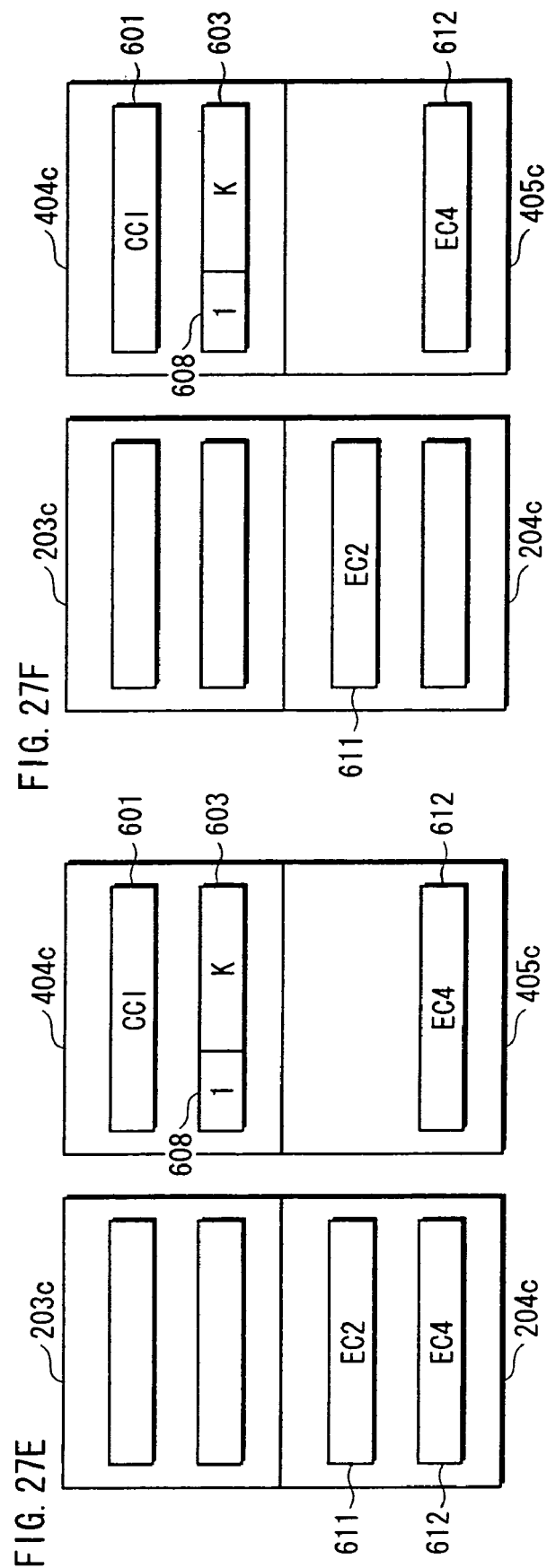
FIGS. 27E and 27F show states of data in recording areas in the above case, continued from FIGS. 26A to 26D.

FIG. 27E shows data states when step S532 has ended, and FIG. 27F shows data states when step S533 has ended.

Figure 28:
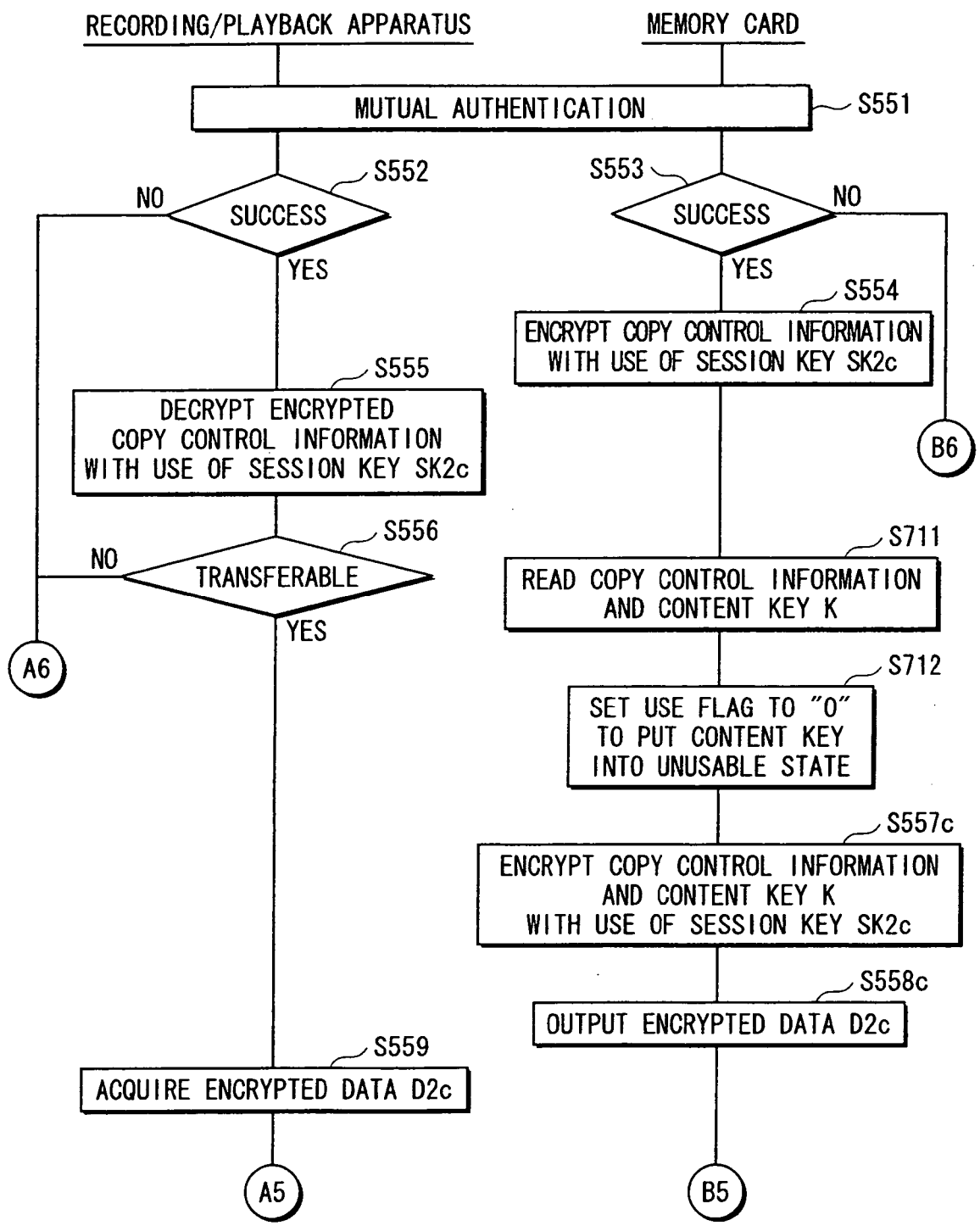
FIG. 28 is a flowchart showing operations in a case of returning the encrypted content EC4, continuing to FIG. 29.

(b) The following describes operations in the case of transferring the encrypted content EC4, which was transferred to the memory card 104 as in the above (a), back to the recording/playback apparatus 102, with reference to FIG. 28.

Steps S551 to 556 show the same processing as in the first embodiment.

If judged in step S557 to be transferable, the encryption/decryption unit 402 reads the copy control information 601 and the content key K 603 from the secure area 404 (step S711). The recording control unit 406 sets the use flag 608 to "0" to put the content key K into an unusable state (step S712). The encryption/decryption unit 402 encrypts the copy control information 601 and the content key K 603 with use of the session key SK2 that was shared by mutual authentication in step S551, thereby generating encrypted data D2c (step S557c). The encryption/decryption unit 402 outputs the generated encrypted data D2c (step S558c).

The encryption/decryption unit 213 acquires the encrypted data D2c (step S559), and decrypts the acquired encrypted data D2c with use of the session key SK2 (step S560), thereby generating the copy control information 601 and the content keys K. The encryption/decryption unit 213 records the generated copy control information 601 and content key K 603 to the information recording unit 203 (step S713).

The recording control unit 406 of the memory card 104 erases the copy control information 601, the use flag 608 and the content key K 603 from the secure area 404 (step S714). The recording control unit 406 also reads the encrypted content EC4 from the data area 405, and outputs the read encrypted content EC4 to the recording/playback apparatus 102 (step S564), and the read/write unit 211 acquires the encrypted content EC4 and records the same to the content recording unit 204 (step S565).

The recording control unit 406 erases the encrypted content EC4 from the data area 405 (step S566).

The encrypted content EC4 is transferred to the recording/playback apparatus 102 as described above. The following describes states of data in the recording areas in this case, with reference to FIGS. 30A to 30D and FIGS. 31E and 31F.

FIG. 30A shows data states when processing has commenced.

FIG. 30B shows data states when step S712 has ended. The use flag 608 has been set to "0" to put the content key K 603 in the unusable state.

FIG. 30C shows data states when step S713 has ended, where the copy control information 601 and the content key K 603 are stored in the information recording unit 203 of the recording/playback apparatus 102.

FIG. 30D shows data states when step S714 has ended, and FIGS. 31E and 31F show data states when step S564 and S565 have ended respectively.

The above described processing in the case of the recording control unit 406 of the memory card 104 managing the use flags.

Note that if the control units of the recording/playback apparatus and the memory card 104 control usable/unusable states according to the use flags, processing is the same as in steps S521 to S529 of FIG. 5, then steps S701 to S533 of FIG. 25.

Figure 29:
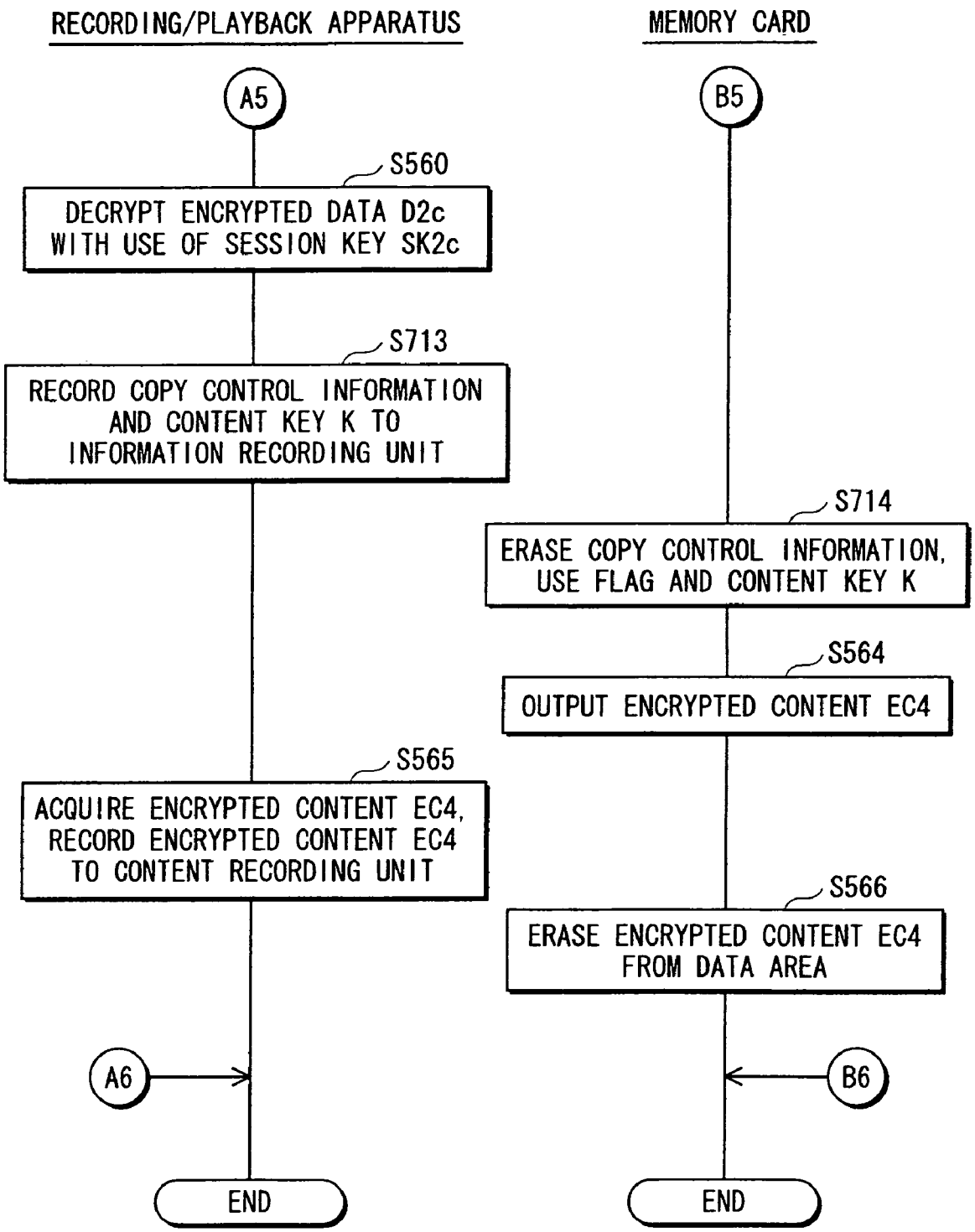
FIG. 29 is a flowchart showing operations in the case of returning the encrypted content EC4, continued from FIG. 28.

In the case of transferring content from the memory card 104 to the recording/playback apparatus 102, processing is the same as steps S551 to S556 of FIG. 8 and FIG. 28, and steps S711 to S560 of FIG. 28. Thereafter, processing is the same as step S561 of FIG. 8, step S714 of FIG. 29, and steps S563 to S565 of FIG. 9.

Similarly to the case in the second embodiment, the recording control unit 406 of the memory card 104b may use the use flags to control usable/unusable states, and the control units of both the recording/playback apparatus 102b and the memory card 104b may use the use flags to control usable/unusable states.

(2) Although the content C2 is received from the content supply apparatus 101 as a digital broadcast in the first and second embodiments, the present invention is not limited to this.

For example, a different supply method such as terrestrial or satellite broadcast, communication via the Internet, or a supply method via a recording medium such as a DVD or BD may be used.

(3) The received content C2 and copy control information may have been encrypted. In this case, the encrypted content C2 and copy control information are decrypted before the judgment unit 202 performs judging.

(4) Although the received content C2 has been converted from MPEG2 to MPEG4 data, another conversion method may of course be used. Also, although a single converted content C4 was generated, a plurality of contents on which different conversions have been performed may be generated. One or a plurality of encrypted contents may be transferred to another recording/playback apparatus or recording medium, and the plurality of generated contents may be encrypted using the same key as in the first embodiment, or encrypted using different keys as in the second embodiment. If the plurality of contents are encrypted using different keys, a single key for decrypting a content to be played is read, and all keys are put in an unusable state thereafter to ensure that two or more contents are not played back simultaneously. Note that this limitation is not applicable if both contents are specially permitted to be used.

Also, although the received content C2 is encrypted without being compressed, the content C2 itself may be converted and recorded.

(5) Although the content key K and the content keys KA and KB are generated in the recording/playback apparatus 102 and 102b, key data generated by another apparatus may be acquired. In this case, the key data may be stored in advance in the information storage unit 203, and acquired as necessary.

(6) The authentication unit 401, encryption/decryption unit 402 and recording control unit 406 of the memory card 104 execute processing in accordance with a method determined by the CPRM SD standard. Also, although content is recorded to the memory card 104 in the first and second embodiments, the present invention can be applied in a case of transferring content to another apparatus.

The present invention can also be used in a case in which content is transferred to another recording/playback apparatus that is the same type as the recording/playback apparatus 102. The present invention is also effective in a case of transferring content from a recording/playback apparatus including a HDD to a device with a smaller recording volume, such as a mobile phone or mobile device.

Also, although the encrypted content EC4 is transferred in the first and second embodiments, the encrypted content EC2 may be transferred.

Note that although described as the memory card 104 in the present embodiment, the recording medium storing the converted encrypted content may be any portable recording medium. If another recording medium is used, processing such as device authentication is performed using a copyright protection technique appropriate for such recording medium.

(7) In the case of transferring content from the recording/playback apparatus 102 to another apparatus, device authentication by the authentication unit and encryption/decryption of the encryption/decryption unit may be executed in accordance with a method determined by the DTCP standard. Other device authentication may also be used.

(8) Although data is erased from the transfer-source recording/playback apparatus or memory card when transferring content, the present invention is not limited to this. For example, the encrypted content stored on the memory card may not be erased, but put into an undecryptable state by erasing only the content key which is necessary for decryption. Also, rather than erasing the entirety of the data, a portion of the data may be destroyed to put the data into an unusable state. Also, the data may be put into an unusable state in which unauthorized access is not possible.

(9) Although the content key K is erased in step S531 and the encrypted content EC4 is erased in step S534 when transferring encrypted content from the recording/playback apparatus 102 to the memory card 104 in the first embodiment, such erasing need not be performed.

The use flag is set to "0" in step S526 to put the content key into an unusable state, thereby making is possible to disable playback of the encrypted content EC4 without erasing it since the content key K is put into an unusable state in the recording/playback apparatus 102 by setting the use flag to "0".

This has the advantage of eliminating the trouble of erasing or rewriting the content key K and encrypted content EC4 when transferring content back from the memory card 104 to the original recording/playback apparatus 102.

Note that there is the same advantage in the case of the content key KB and the encrypted content EC4B of the second embodiment.

(10) In the above-mentioned first and second embodiments, the recording/playback apparatus may include a storage unit for storing a status transition in content transfer processing.

If a transfer of content is not completed properly, the recording/playback apparatus may judge, based on the status transition stored in the storage unit, whether to continue the content transfer processing or start the content transfer processing over from the beginning.

Furthermore, the recording/playback apparatus may include a notification unit for notifying the status transition stored in the storage unit to a user. In this case, the notification unit notifies the user that the content transfer was not completed properly, and determines, based on an instruction from the user, whether to continue the content transfer processing or start the content transfer processing over from the beginning.

(11) In the case of erasing a content key in the recording/playback apparatus or the memory card after a transfer, the device to which the content key was transferred may notify the source device that the content key was recorded properly, and the source device may erase the content key after receiving the notification and confirming reception of the content key.

(12) When transferring encrypted content from the memory card 104 to the recording/playback apparatus 102, the transfer may be performed once the content to be transferred is confirmed to be content that was surely transferred from the recording/playback apparatus 102 to the memory card 104. The following mentions a method for this.

(a) Attaching an Identifier to Content

An identifier is attached to each piece of content for unique identification thereof, and the recording/playback apparatus stores the identifier of a piece of encrypted content when it is transferred to the memory card.

If encrypted content that was transferred to the memory card 104 is transferred back to the original recording/playback apparatus 102, the recording/playback apparatus 102 judges whether its stored identifier and the identifier of the encrypted content recorded on the memory card match, and, if there is a successful match, judges the encrypted content to be transferred to be content that was surely transferred from the recording/playback apparatus to the memory card, and allows the encrypted content to be transferred to the recording/playback apparatus.

(b) Attaching an Identifier to Content, and Attaching Identification Information to the Memory Card A unique identifier is attached to each piece of encrypted content recorded in the recording/playback apparatus, and unique identification information is also attached to the memory card. When transferring encrypted content to the memory card, the recording/playback apparatus performs transfer processing after associating the identifier of the encrypted content with the identification information of the destination memory card, and storing this as history information.

Then when transferring the encrypted content from the memory card to the recording/playback apparatus, the recording/playback apparatus acquires the identification information and identifier of the encrypted content from the source memory card, and checks whether they match the history information stored in the recording/playback apparatus.

If the identification information and identifier match the history information, the recording/playback apparatus judges that the encrypted content to be transferred was transferred from the recording/playback apparatus to the memory card, and proceeds with the transfer processing. The recording/playback apparatus erases the history information once the transfer from the memory card to the recording/playback apparatus is complete.

However, if the result of the check indicates a failure to match, the transfer processing is prohibited. In this case, even if the transfer processing is performed, the user is presented with a display on the monitor alerting that restoration to high-quality content cannot be performed since the encrypted content was not transferred from the recording/playback apparatus. The user may then be caused to select whether to stop or continue the transfer processing.

Note that this technique is effective even if there are more than one pieces of encrypted content that have been transferred from the recording/playback apparatus. In this case, pairs of identifiers for encrypted content to be transferred and identification information for memory cards are stored. When encrypted content is transferred from the memory card to the recording/playback apparatus, the recording/playback apparatus judges whether the pair of identifier and identification information exists in the history information.

(c) Recording a Content Identifier and Recording/Playback Apparatus Identification Information to a Memory Card A unique identifier is attached to each piece of encrypted content, and unique identification information is attached to the recording/playback apparatus.

When transferring encrypted content from the recording/playback apparatus to the memory card, history information including the identifier of the encrypted content to be transferred and the identification information of the source recording/playback apparatus is recorded to the memory card. The recording/playback apparatus stores its own identification information and the identifier of the transferred encrypted content.

Next, when transferring the encrypted content from the memory card to the recording/playback apparatus, the recording/playback apparatus acquires the history information from the memory card, and checks whether the identifier and identification information included in the history information matches the encrypted content identifier stored in the recording apparatus and its own identification information.

If the identifier and identification information match, the recording/playback apparatus judges that the encrypted content was surely transferred from the recording/playback apparatus to the memory card, and proceeds with the transfer processing. The history information is then erased from the memory card once the transfer from the memory card to the recording/playback apparatus is complete.

However, if the result of the check indicates a failure to match, the transfer processing is prohibited. In this case, even if the transfer processing is performed, the user is presented with a display on the monitor alerting that restoration to high-quality content cannot be performed since the encrypted content was not transferred from the recording/playback apparatus. The user may then be caused to select whether to stop or continue the transfer processing.

Note that if there are a plurality of contents to be transferred, the memory card may store a plurality of identifiers for transferred contents, and when encrypted content is being transferred back, the recording/playback apparatus may judge whether the identifier included in acquired history information is the same as the stored identifier.

(d) Recording Recording/Playback Apparatus Identification Information to a Memory Card While an identifier is not attached to encrypted content, identification information for unique identification is attached to the source recording/playback apparatus. When encrypted content is transferred to the memory card, the recording/playback apparatus records the encrypted content to the memory card in association with the identification information.

When transferring the encrypted content back from the memory card, the recording/playback apparatus acquires the identification information pertaining to the encrypted content to be transferred, and checks whether the acquired identification and its stored identification information match. If identification information matches, the encrypted content is judged to have been transferred from the recording/playback apparatus to the memory card, and transferring the encrypted content back to the recording/playback apparatus is permitted. The identification information is erased from the memory card once the re-transfer processing is completed.

Performing such processing enables the protection of copyrights when transferring content from the memory card to the recording/playback apparatus, and assured restoration of high-quality content.

(13) Although an exemplary case of receiving a single content C2 is described in the first and second embodiment, the present invention is of course not limited to this.

A plurality of contents may be received and recorded, and in this case, IDs are attached to the contents and received along with the copy control information for the contents. When storing the copy control information and converted contents, they are stored in association with the corresponding ID. The IDs are also attached to keys if different keys were used to encrypt the contents.

(14) Although received content has been converted in advance before being stored in the first and second embodiments, content may be received and encrypted without being converted, then, when transferring the encrypted content to the memory card, the encrypted content may be decrypted and converted, and the converted content may be encrypted and recorded to the memory card.

(15) When transferring the encrypted content EC4 recorded on the memory card 104 back to the recording/playback apparatus 102 in the first embodiment, copy control information 601 is transmitted to the recording/playback apparatus 102 in steps S554 and S555 of FIG. 8, transferability is judged in step S556, and transfer processing is performed thereafter if the content is judged to be transferable; the present invention, however, is not limited to this.

(a) For example, after judging whether the content is transferable in step S556, the recording/playback apparatus 102 holds the copy control information 601 if the content is judged to be transferable. Instead of steps S557 and S558, the memory card 104 encrypts only the content key K 603, and outputs the encrypted content key K to the recording/playback apparatus 102. The recording/playback apparatus 102 acquires and decrypts the encrypted content key K to obtain the content key K 603. Processing is then continued from step S561.

(b) Also, the memory card 104 may encrypt the content key K 603 along with the copy control information 601 in step S554, and transmit the generated encrypted data D2 to the recording/playback apparatus 102. In this case, the recording/playback apparatus 102 decrypted the encrypted data D2 to generate the copy control information 601 and the content key K 603, instead of step S555. Also, the judging of step S556 is performed, and processing continues from step S561 without performing the processing of step S557 to S560.

(16) Although copy control information, use flags, and content keys K are stored in the information recording unit 203, and the encrypted contents EC2 and EC4 are stored in the content recording unit 204 in the first embodiment, the present invention is not limited to this.

For example, the use flags and content keys K may be stored in the information recording unit 203, and copy control information encrypted using a content key K may be stored along with the encrypted content in the content recording unit 204. Here, the encrypted copy control information and the encrypted content EC2 or EC4 may be stored as a single piece of data.

Also, for example, a separate encryption key for encrypting the copy control information, the use flags and the content keys K may be generated and stored in the information recording unit 203, and copy control information, use flags and content keys K that were encrypted using the encryption key may be stored in the content recording unit 204.

Note that the same follows for the second embodiment as well.

(17) Although data transmitted/received securely between the recording/playback apparatus and the memory card is encrypted using a shared session key in the first and second embodiments, the present invention is not limited to this. Another technique may be used as long as a content key, etc. can be safely transferred between the recording/playback apparatus and the memory card.

(18) Although a usable state and an unusable state are judged using use flags in the first and second embodiments, another technique may be used. The other technique need only be able to put the content key in an unusable state, which may be a state that is judged by software to be unusable, or a state in which hardware is used to cut access to the content key.

(19) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network acting as an internet, a data broadcast, etc.

Also, the present invention may be a computer system including a microprocessor and a memory, whereby the memory stores the computer program, and the microprocessor operates in accordance with the computer program.

Also, the present invention may be carried out by another independent computer system by transferring the program or the digital signals which have been recorded on the recording media, or by transferring the program or the digital signals via the network, etc.

(20) The above embodiments and the above variations may be combined.

6. Summary (1) As described above, the present invention is a recording apparatus for transferring a usage right of a content to an external recording medium while protecting a copyright of the content, including a storage unit operable to store a first encrypted content generated by encrypting the content, a second encrypted content generated by performing an irreversible compression to convert the content, thereby obtaining a converted content, and by encrypting the converted content, and a content key for decryption of the first and second encrypted contents; a key transfer unit operable to write the content key to the external recording medium, and erase the content key stored in the storage unit; and a content transfer unit operable, after the content key has been erased, to write the second encrypted content to the external recording medium, and erase the second encrypted content from the storage unit.

According to this structure, the content key is erased from the recording apparatus, thereby disabling use the first encrypted content in the recording apparatus, and enabling the protection of a copyright. Also, the unconverted content can be used if the content key is acquired, since the first encrypted content is left recorded in the recording apparatus.

(2) In the recording apparatus of (1), the key transfer unit may include a writing subunit operable to write the content key to the external recording medium, an erasing subunit operable to erase the content key stored in the storage unit, a reading subunit operable to read the content key from the storage unit, and a prohibiting subunit operable, after the content key has been read, to prohibit use of the content key stored in the storage unit, and the writing subunit may perform the writing after the prohibiting subunit has performed the prohibiting.

Also, in the recording apparatus, the content key may be in association with usability information indicating that the content key can be used, and the prohibiting subunit may rewrite the usability information to use-prohibited information indicating that use of the content key is prohibited.

According to this structure, unauthorized use of the content key recorded in the storage unit during transfer processing can be prevented since two usable content keys never exist.

(3) The recording apparatus of (1) may further include a key re-transfer unit operable, after the second encrypted content and the content key have been written to the external recording medium, to acquire the content key from the external recording medium, write the acquired content key to the storage unit in a use-prohibited state, erase the content key from the external recording medium, and permit use of the content key written to the storage unit.

Also, in the recording apparatus, the key re-transfer unit may further write use-prohibited information indicating that use of the content key is prohibited, in association with the content key, and after erasing the content key from the external recording medium, rewrite the use-prohibited information to usability information indicating that the content key can be used.

According to this structure, the pre-conversion content can be restored and used by transferring the content key from the recording medium. Also, a set of the second content and content key does not exist on the recording medium since the content key is erased from the recording medium, and a copyright can be protected since the converted content cannot be used.

(4) The recording apparatus of (1) may further include an acquisition unit operable to acquire the content; a conversion unit operable to convert the acquired content; and an encryption unit operable to encrypt the content and the converted content to generate the first and second encrypted contents that are decryptable using the content key.

According to this structure, conversion is performed before storage, thereby making it possible to reduce the amount of time from start to end of transferring, compared with a case of performing conversion during a transfer to the recording medium.

(5) The recording apparatus of (1) may further include a decryption unit operable to read the content key, and decrypt the first encrypted content or the second encrypted content with use of the read content key, thereby generating the content or the converted content respectively; a playback unit operable to playback the generated one of the content and the converted content; and a prohibiting unit operable to prohibit use of the content key stored in the stored unit after the content key has been read and before the playback unit performs the playback.

According to this structure, it is possible to prevent unauthorized use since exclusively either decryption and playback processing for one content, or decryption and playback processing for another content can be performed.

(6) In the recording apparatus of (1), the storage unit may further store, instead of the content key, a first content key for decryption of the first encrypted content and a second content key for decryption of the second encrypted content, the transfer unit may include a reading subunit operable to read the second content key, a writing subunit operable to write the read second content key to the external recording medium, and an erasing subunit operable to erase the second content key from the storage unit, and the recording apparatus may further include a prohibiting unit operable to prohibit use of the first and second content keys after the second content key has been read.

According to this structure, unauthorized playback of the first encrypted content is not possible, even if contents are encrypted using different keys, since use of the first content key for decrypting the first encrypted content left recorded on the recording apparatus is prohibited.

(7) The recording apparatus of (6) may further include an erasing unit operable to erase the second content key from the external recording medium; and a permitting unit operable to permit use of the first content key, the erasing unit performing the erasing and the permitting unit performing the permitting after the second encrypted content and the second content key have been written to the external recording medium.

According to this structure, the second encrypted content becomes unusable since the second content key recorded on the recording medium is erased, and decryption of the first encrypted content is possible since use of the first content key is permitted. The pre-conversion content is therefore usable, and a copyright can be protected since two usable contents never exist simultaneously.

(8) The recording apparatus of (6) may further include a decryption unit operable to read the first content key from the storage unit, and decrypt the first encrypted content with use of the read first content key, thereby generating the content; a playback unit operable to playback the generated content; and a prohibiting unit operable, after the first content key has been read by the decryption unit and before the playback unit commences the playback, to prohibit use of the first and second content keys stored in the storage unit.

According to this structure, decryption and playback of one content cannot be performed while decryption and playback of another content is being performed, since use of both content keys is prohibited, thereby enabling the prevention of unauthorized use and the protection of a copyright.

(9) In the recording apparatus of (1), the external recording medium may be a portable recording medium that can be connected to a mobile device.

In general, portable recording media have smaller storage volumes than an HDD and the like, and the quality of the content is reduced when image conversion is performed to reduce the amount of data for transferring the content to such recording media. If the content is compressed, transferred to a recording medium, then transferred back from the recording medium to the original HDD, applying the present invention enables viewing of the high-quality content since the content before image conversion has been encrypted and stored on the HDD. Also, the content key is erased from the recording apparatus after the transfer, thereby making it impossible to decrypt the encrypted content even if it is recorded, and enabling the protection of a copyright.

(10) In (1), the external recording medium may be mounted in another apparatus that includes a decryption unit operable to decrypt the second encrypted content with use of the content key, thereby generating the content, and a playback unit operable to playback the generated content.

According to this structure, even if content is transferred to another apparatus, a copyright can be similarly protected, and the original content can be used.

(11) In (1), the irreversible compression converts received content to content with a lower quality, and reduces the amount of data to increase the compression ratio.

According to this structure, the amount of data is decreased, thereby enabling the second encrypted content to be transferred to a recording medium with a smaller storage volume.

INDUSTRIAL APPLICABILITY

The present invention can be used operationally as well as recurrently and continually in a software industry which provides software such as computer programs and content which includes digitized copyrighted works such as movies and music. The recording/playback apparatus and recording medium of the present invention can be produced and retailed in manufacturing industries for electrical products and the like.

The invention claimed is:

1. A recording apparatus for transferring a usage right of a content to an external recording medium while protecting a copyright of the content, comprising: a storage unit operable to store i) a first encrypted content generated by encrypting the content, (ii) a second encrypted content generated by performing an irreversible compression to convert the content thereby obtaining a converted content, and by encrypting the converted content, and (iii) a content key for decryption of the first and second encrypted contents;

a key transfer unit operable to write the content key to the external recording medium, and erase the content key stored in the storage unit; and a content transfer unit operable, after the content key has been erased, to write the second encrypted content to the external recording medium, and erase the second encrypted content from the storage unit, wherein the key transfer unit includes:

a writing subunit operable to write the content key to the external recording medium;

an erasing subunit operable to erase the content key stored in the storage unit;

a reading subunit operable to read the content key from the storage unit; and a prohibiting subunit operable, after the content key has been read, to prohibit use of the content key stored in the storage unit, wherein the writing subunit performs the writing after the prohibiting subunit has performed the prohibiting, wherein the content key is in association with usability information indicating that the content key can be used, and wherein the prohibiting subunit rewrites the usability information to use-prohibited information indicating that use of the content key is prohibited.

2. The recording apparatus of claim 1, further comprising:
a key re-transfer unit operable, after the second encrypted content and the content key have been written to the external recording medium, to acquire the content key from the external recording medium, write the acquired content key to the storage unit in a use-prohibited state, erase the content key from the external recording medium, and permit use of the content key written to the storage unit.

3. The recording apparatus of claim 2, wherein
the key re-transfer unit further writes use-prohibited information indicating that use of the content key is prohibited, in association with the content key, and after erasing the content key from the external recording medium, rewrites the use-prohibited information to usability information indicating that the content key can be used.

4. The recording apparatus of claim 1, further comprising:
an acquisition unit operable to acquire the content;
a conversion unit operable to convert the acquired content; and
an encryption unit operable to encrypt the content and the converted content to generate the first and second encrypted contents that are decryptable using the content key.

5. The recording apparatus of claim 1, further comprising:
a decryption unit operable to read the content key, and decrypt the first encrypted content or the second encrypted content with use of the read content key, thereby generating the content or the converted content respectively;
a playback unit operable to playback the generated one of the content and the converted content; and
a prohibiting unit operable to prohibit use of the content key stored in the stored unit after the content key has been read and before the playback unit performs the playback.

6. The recording apparatus of claim 1, wherein
the storage unit further stores, instead of the content key, a first content key for decryption of the first encrypted content and a second content key for decryption of the second encrypted content,
the transfer unit includes
  a reading subunit operable to read the second content key,
  a writing subunit operable to write the read second content key to the external recording medium, and
  an erasing subunit operable to erase the second content key from the storage unit, and
the recording apparatus further comprises:
  a prohibiting unit operable to prohibit use of the first and second content keys after the second content key has been read.

7. The recording apparatus of claim 6, further comprising:
an erasing unit operable to erase the second content key from the external recording medium; and
a permitting unit operable to permit use of the first content key, wherein
the erasing unit performs the erasing and the permitting unit performs the permitting after the second encrypted content and the second content key have been written to the external recording medium.

8. The recording apparatus of claim 6, further comprising:
a decryption unit operable to read the first content key from the storage unit, and decrypt the first encrypted content with use of the read first content key, thereby generating the content;
a playback unit operable to playback the generated content; and
a prohibiting unit operable, after the first content key has been read by the decryption unit and before the playback unit commences the playback, to prohibit use of the first and second content keys stored in the storage unit.

9. The recording apparatus of claim 1, wherein
the external recording medium is a portable recording medium that can be connected to a mobile device.

10. The recording apparatus of claim 1, wherein the external recording medium is mounted in another apparatus that includes
a decryption unit operable to decrypt the second encrypted content with use of the content key, thereby generating the content, and
a playback unit operable to playback the generated content.

11. A content protection system for transferring a usage right of a content from a recording apparatus to an external recording medium while protecting a copyright of the content, the recording apparatus including: a storage unit operable to store (i) a first encrypted content generated by encrypting the content, (ii) a second encrypted content generated by performing art irreversible compression to convert the content, thereby obtaining a converted content, and by encrypting the converted content, and (iii) a content key for decryption of the first and second encrypted contents;
  a key transfer unit operable to write the content key to the external recording medium, and erase the content key stored in the storage unit; and
  a content transfer unit operable after the content key has been erased, to write the second encrypted content to the external recording medium, and erase the second encrypted content from the storage unit,
wherein the recording medium includes a storage area operable to store the content key and the second encrypted context,
wherein the key transfer unit includes:
  a writing subunit operable to write the content key to the external recording medium;
  an erasing subunit operable to erase the content key stored in the storage unit;
  a reading subunit operable to read the content key from the storage unit; and
  a prohibiting subunit operable, after the content key has been read, to prohibit use of the content key stored in the storage unit,
wherein the writing subunit performs the writing after the prohibiting subunit has performed the prohibiting,
wherein the content key is in association with usability information indicating that the content key can be used, and
wherein the prohibiting subunit rewrites the usability information to use-prohibited information indicating that use of the content key is prohibited.

12. A non-transitory portable recording medium for receiving a transfer of a usage right of a content from a recording apparatus while protecting a copyright of the content, the recording apparatus including:
  a storage unit operable to store (i) a first encrypted content generated by encrypting the content, (ii) a second encrypted content generated by performing an irreversible compression to convert the content, thereby obtaining a converted content, and by encrypting the converted content, and (iii) a content key for decryption of the first and second encrypted contents;

a key transfer unit operable to write the content key to the external recording medium, and erase the content key stored in the storage unit; and a content transfer unit operable, after the content key has been erased, to write the second encrypted content to the external recording medium and erase the second encrypted content from the storage unit, wherein the recording medium includes a storage area operable to store the content key and the second encrypted context, wherein the key transfer unit includes:

a writing subunit operable to write the content key to the external recording medium;

an erasing subunit operable to erase the content key stored in the storage unit;

a reading subunit operable to read the content key from the storage unit; and a prohibiting subunit operable, after the content key has been read, to prohibit use of the content key stored in the storage unit, wherein the writing subunit performs the writing after the prohibiting subunit has performed the prohibiting, wherein the content key is in association with usability information indicating that the content key can be used, and wherein the prohibiting subunit rewrites the usability information to use-prohibited information indicating that use of the content key is prohibited.

13. A content transfer method used in a recording apparatus for transferring a usage right of a content to an external recording medium while protecting a copyright of the content, the recording apparatus storing in a storage unit (i) a first encrypted content generated by encrypting the content, (ii) a second encrypted content generated by performing an irreversible compression to convert the content, thereby obtaining a converted content, and by encrypting the converted content, and (iii) a content key for decryption of the first and second encrypted contents, the content transfer method comprising:

a key transfer step of writing the content key to the external recording medium, and erasing the content key stored in the storage unit; and a content transfer step of, after the content key has been erased, writing the second encrypted content to the external recording medium, and erasing the second encrypted content from the storage unit, wherein the key transfer step includes:

a writing step of writing the content key to the external recording medium;

an erasing step of erasing the content key stored in the storage unit;

a reading step of reading the content key from the storage unit; and a prohibiting step of, after the content key has been read by the reading step, prohibiting use of the content key stored in the storage unit, wherein the writing step is performed after the prohibiting step, wherein the content key is in association with usability information indicating that the content key can be used, and wherein the prohibiting step includes rewriting the usability information to use-prohibited information indicating that use of the content key is prohibited.

14. A non-transitory computer-readable recording medium having recorded thereon a content transfer program used in a recording apparatus for transferring a usage right of a content to an external recording medium while protecting a copyright of the content, the recording apparatus storing in a storage unit (i) a first encrypted content generated by encrypting the content, (ii) a second encrypted content generated by performing an irreversible compression to convert the content, thereby obtaining a converted content, and by encrypting the converted content, and (iii) a content key for decryption of the first and second encrypted contents, the content transfer program comprising:

a key transfer step of writing the content key to the external recording medium, and erasing the content key stored in the storage unit; and a content transfer step of, after the content key has been erased, writing the second encrypted content to the external recording medium, and erasing the second encrypted content from the storage unit, wherein the key transfer step includes:

a writing step of writing the content key to the external recording medium;

an erasing step of erasing the content key stored in the storage unit;

a reading step of reading the content key from the storage unit; and a prohibiting step of, after the content key has been read by the reading step, prohibiting use of the content key stored in the storage unit, wherein the writing step is performed after the prohibiting step, wherein the content key is in association with usability information indicating that the content key can be used, and wherein the prohibiting step includes rewriting the usability information to use-prohibited information indicating that use of the content key is prohibited.

* * * * *